US008869285B2

(12) United States Patent
Kanda et al.

(10) Patent No.: US 8,869,285 B2
(45) Date of Patent: *Oct. 21, 2014

(54) FILE SERVER, FILE SERVER LOG MANAGEMENT SYSTEM AND FILE SERVER LOG MANAGEMENT METHOD

(75) Inventors: Akitsugu Kanda, Sagamihara (JP); Etsutaro Akagawa, Kawasaki (JP); Yohsuke Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 765 days.

This patent is subject to a terminal disclaimer.

(21) Appl. No.: 12/320,727

(22) Filed: Feb. 3, 2009

(65) Prior Publication Data
US 2009/0150455 A1   Jun. 11, 2009

Related U.S. Application Data

(63) Continuation of application No. 11/329,207, filed on Jan. 11, 2006, now Pat. No. 7,506,375.

(30) Foreign Application Priority Data

Nov. 22, 2005 (JP) ................................. 2005-337632

(51) Int. Cl.
| G06F 11/00 | (2006.01) |
| G06F 12/14 | (2006.01) |
| G06F 12/16 | (2006.01) |
| G06F 17/30 | (2006.01) |
| G06F 21/53 | (2013.01) |
| G06F 11/14 | (2006.01) |

(52) U.S. Cl.
CPC ...... G06F 17/30067 (2013.01); G06F 11/1471 (2013.01); G06F 21/53 (2013.01); G06F 2221/2101 (2013.01)
USPC ........................................... 726/25; 713/178

(58) Field of Classification Search
USPC .............. 726/25; 1/1; 707/201, 202; 711/161
See application file for complete search history.

(56) References Cited

U.S. PATENT DOCUMENTS

| 4,843,541 A | 6/1989 | Bean et al. | |
| 6,021,414 A * | 2/2000 | Fuller .................................... | 1/1 |

(Continued)

FOREIGN PATENT DOCUMENTS

| JP | 8-263330 | 3/1995 |
| JP | 2001-337864 A | 12/2001 |

(Continued)

OTHER PUBLICATIONS

M.E.J Newman ; Scientific collaboration networks; Dec. 2000; Cornell University; pp. 1-8.*

(Continued)

*Primary Examiner* — Philip Chea
*Assistant Examiner* — Monjour Rahim
(74) *Attorney, Agent, or Firm* — Foley & Lardner LLP

(57) ABSTRACT

The present invention provides a log management system which is devised so that improper behavior by managers with regard to the log information can easily be discovered. Virtual OS are respectively installed for respective users in a file server that can also be constructed as an NAS device. These virtual OS function as virtual NAS. The virtual OS and manager OS can exchange information relating to log information via an information exchange part constructed as a kernel. The log information produced in the virtual OS is transmitted to a first log management device via a first communications network, and is also transmitted to a second log management device via a second communications network. The respective networks are separated. As a result of the same log information being managed by multiplex management using separate management devices, it can be detected whether or not there has been any improper behavior with respect to the log information.

12 Claims, 17 Drawing Sheets

(56) References Cited

U.S. PATENT DOCUMENTS

| | | | |
|---|---|---|---|
| 6,092,084 A | 7/2000 | Clark et al. | |
| 6,170,067 B1* | 1/2001 | Liu et al. | 714/48 |
| 6,178,427 B1 | 1/2001 | Parker | |
| 6,466,950 B1* | 10/2002 | Ono | 1/1 |
| 6,721,749 B1 | 4/2004 | Najm et al. | |
| 7,051,173 B2 | 5/2006 | Tsuchiya et al. | |
| 7,133,988 B2 | 11/2006 | Fujibayashi | |
| 2001/0025311 A1 | 9/2001 | Arai et al. | |
| 2002/0116632 A1 | 8/2002 | Itoh et al. | |
| 2003/0226058 A1 | 12/2003 | Miller et al. | |
| 2004/0139124 A1* | 7/2004 | Kawamura et al. | 707/202 |
| 2005/0235005 A1* | 10/2005 | Aono | 707/201 |
| 2005/0256869 A1 | 11/2005 | Ikegami | |
| 2006/0010180 A1 | 1/2006 | Kawamura et al. | |
| 2006/0075308 A1 | 4/2006 | Haselden et al. | |
| 2006/0112149 A1 | 5/2006 | Kan et al. | |
| 2008/0005508 A1* | 1/2008 | Asano et al. | 711/161 |
| 2009/0094422 A1* | 4/2009 | Kerns | 711/161 |

FOREIGN PATENT DOCUMENTS

| | | |
|---|---|---|
| JP | 2002-251326 A | 9/2002 |
| JP | 2004-164226 | 6/2004 |
| JP | 2005-025617 | 1/2005 |

OTHER PUBLICATIONS

C. Lonvick, "RFC 3164—The BSD Syslog Protocol", Network Working Group, Informational, Aug. 2001, pp. 1-19.
European Search Report dated Sep. 22, 2006.
Karin Petersen, "Flexible Update Propagation for Weakly Consistent Replication", Year: 1997,. ACM New York, pp. 288-301.
Japanese Patent Office office action on application No. 2005-337632 dated Mar. 23, 2011; 2 pages.

* cited by examiner

| 142 |||
|---|---|---|
| MANAGER OS LOG TRANSFER DESTINATION MANAGEMENT DB |||
| TRANSFER DESTINATION IP ADDRESS OF NAS SECURITY MANAGEMENT DEVICE | PROTOCOL TYPE | PORT NUMBER |
| aaa.aaa.aaa.aaa | UDP | 514 |

FIG. 7

| TRANSFER OPTION MANAGEMENT DB 143 ||
|---|---|
| VIRTUAL OS NUMBER | TRANSFER FLAG |
| VOS1 | 1 |
| VOS2 | 0 |
| VOS3 | 1 |
| ... | ... |

FIG. 8

| VIRTUAL OS LOG TRANSFER DESTINATION MANAGEMENT DB 144 |||
|---|---|---|
| TRANSFER DESTINATION IP ADDRESS OF TRUNK NETWORK MANAGEMENT | PROTOCOL TYPE | PORT NUMBER |
| bbb.bbb.bbb.bbb | UDP | 162 |

FIG. 11

LOG MANAGEMENT DATA BASE 641

| NAS NODE # | INFORMATION RELATING TO VIRTUAL OS ||| INFORMATION RELATING TO FS ||||
| --- | --- | --- | --- | --- | --- | --- | --- |
| | NAME OF VIRTUAL OS | DATE OF INITIATION OF OPERATION | DATE OPERATION ENDED | STATUS | FS NAME | DATE OF INITIATION OF OPERATION | DATE OPERATION ENDED | STATUS | TYPE |
| NAS NODE 1 | VOS11 | 2005/01/01 | — | IN OPERATION | NAS1-1 | 2005/01/01 | — | IN OPERATION | WORM |
| | | | | | NAS1-2 | 2005/01/05 | — | IN OPERATION | ORDINARY |
| | VOS12 | 2005/01/05 | — | IN OPERATION | | | | | |
| | ... | | | | | | | | |
| NAS NODE 2 | VOS21 | | | | | | | | |
| | ... | | | | | | | | |
| ... | ... | | | | | | | | |

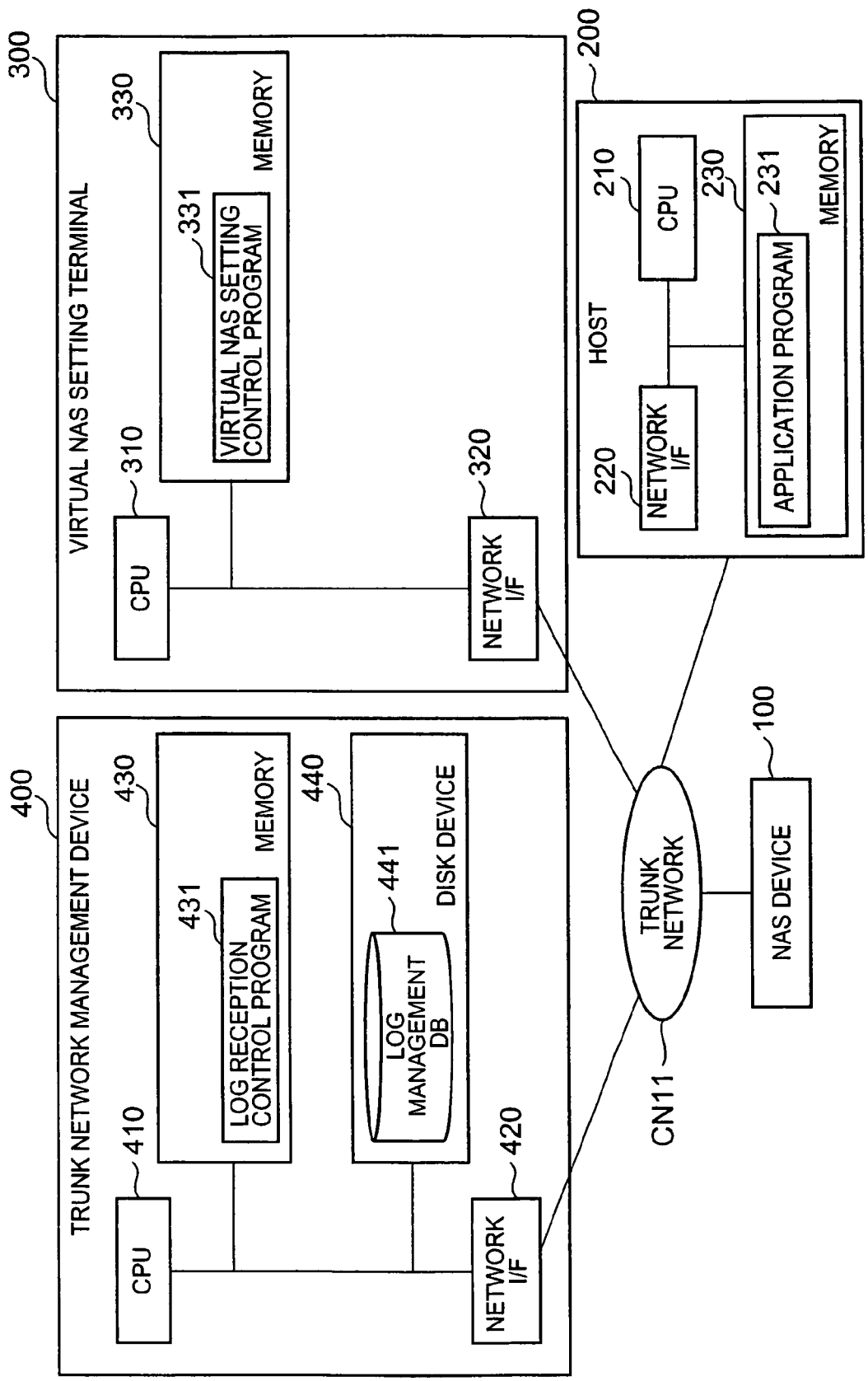

FIG. 14

| | INTER-OS COMMUNICATIONS MANAGEMENT TABLE | | | T1 |
|---|---|---|---|---|
| | RECEPTION ID | RECEPTION SOURCE | REQUEST ID | REQUEST DESTINATION |
| FIRST LINE | ID1 | MANAGER OS | ID2 | VIRTUAL OS |
| SECOND LINE | ID3 | VIRTUAL OS | ID4 | MANAGER OS |
| THIRD LINE | ID5 | VIRTUAL OS | ID6 | MANAGER OS |
| FOURTH LINE | ID7 | MANAGER OS | ID8 | VIRTUAL OS |

FILE SERVER, FILE SERVER LOG MANAGEMENT SYSTEM AND FILE SERVER LOG MANAGEMENT METHOD

CROSS-REFERENCE TO RELATED APPLICATIONS

This application is a Continuation application of U.S. application Ser. No. 11/329,207 filed on Jan. 11, 2006 now U.S. Pat. No. 7,506,375. Priority is claimed from U.S. application Ser. No. 11/329,207 filed on Jan. 11, 2006, which claims the priority of Japanese Patent Application No. 2005-337632 filed on Nov. 22, 2005, the entire disclosure of which is incorporated herein by reference.

BACKGROUND

The present invention relates to a file server, a file server log management program and a file server log management method.

In order to achieve the efficient management of large quantities of data, which are increasing day by day, file servers which manage numerous files, previously dispersed and managed by means of a plurality of computers, by gathering these files together in a single place have become popular. In particular, file servers of the type known as "NAS" (network attached storage) differ from file servers of the all-purpose type in which an all-purpose file server function is installed in an all-purpose computer in that NAS are designed especially as file servers. Accordingly, NAS show a high processing performance and reliability as file servers, and can be used comparatively easily immediately following introduction. Consequently, such systems are widely used.

In order to allow the accurate management of setting alterations in respective devices, and time when evens such as unauthorized intrusions and the like occur, NAS and network managers to which NAS are connected manage all of the log information in these respective devices in a concentrated manner in special servers called log management devices (Japanese Patent Application Laid-Open No. 8-263330).

However, if the authority of the manager of a log management device is used, log information stored in the log management device can be deleted, and the content can be rewritten. Accordingly, the log information stored in a log management device cannot be relied upon "as is".

Consequently, for example, a system has also been proposed in which the log information recorded by devices installed on a network is respectively transmitted to a plurality of log management devices by using a syslog protocol (See "RFC3164—The BSD Syslog Protocol", Requests for Comments (3164), by C. Lonvick, August 2001. As a result, the same log information can be redundantly managed in a plurality of log management devices having respectively different managers.

Generally, with the ease of management work and the like being taken into account, servers and log management devices, and the networks in which these servers and log management devices are installed, are comprehensively managed by the same manager. In this case, however, the manager himself can rewrite or delete log information. Accordingly, it is difficult to discover unauthorized behavior (behavior such as the modification of log information or the like) on the part of the manager himself, or unauthorized behavior on the part of a third party usurping the authority of the manager.

On the other hand, in cases where the same log information is respectively transmitted to a plurality of log management devices, and the respective log management devices are managed by different managers, the reliability is improved compared to cases in which the log information is managed in a single place.

Even in such cases, however, since the respective log management devices are installed on the same network, there is a danger that one of the respective managers, or a third party, may modify log information managed by some log management devices or the like using the fragility of other log management devices in terms of security.

SUMMARY

The present invention was devised in light of the above-mentioned problem points; it is an object of the present invention to provide a file server, a file server log management system and a file server log management method which are devised so that the reliability of log information management can be improved. It is another object of the present invention to provide a file server, a file server log management system and a file server log management method which are devised so that log information can be transmitted to and held in separate log management devices in which a plurality of log management devices are separated from each other, by installing a communications path that allows the exchange of information relating to log information between a first operating system and a second operating system, thus improving reliability. Other objects of the present invention will become clear from the description of embodiments below.

In the present invention, in order to solve the abovementioned problems, the same log information is redundantly processed by separate log management devices installed on a plurality of communications networks that are separated from each other, by providing an inter-operating-system communications part that is used to exchange information relating to log information.

The file server according to one aspect of the present invention is a file server in which a first operating system and a second operating system are respectively operated, comprising an inter-operating-system communications part that is used to exchange information between the first operating system and the second operating system, a log information producing part which produces log information relating to the change in settings in cases where the settings are changed in the first operating system, a first log transmitting part which transmits the log information thus produced from the first operating system to a first log management device via a first communications network that is connected to this first operating system, and a second log transmitting part which transmits the abovementioned produced log information from the first operating system to the second operating system via the abovementioned inter-operating-system communications part, and which transmits this information from the second operating system to a second log management device via a second communications network which is separated from the abovementioned first communications network, and which is connected to the second operating system.

For example, dedicated first operating systems can be virtually constructed for each of the respective users utilizing the file server. Furthermore, one or a plurality of file systems for storing and managing user data can be provided in these first operating systems. A second operating system can be provided in order to manage one or a plurality of first operating systems. The second operating system can exchange data with the first operating system(s) via an inter-operating-system communications part. Moreover, a first communications network that has a first log management device is connected only to the first operating system(s), and a second communications network that has a second log management device is connected only to the second operating system. The first communications network can be constructed as a virtual communications network that is virtually disposed in a physical communications network.

As a result, the same log information that is produced in relation to the first operating system(s) can be respectively transmitted to the first and second communications networks in a state in which the first communications network, which is connected to the first operating system(s), and the second communications network, which is connected to the second operation system, are separated, and this log information can be respectively managed by separate log management devices. Accordingly, the same log information can be managed by duplex management using a plurality of mutually separated log management devices, so that the reliability of the system can be improved.

In an embodiment of the present invention, the inter-operating-system communications part exchanges only specified instructions registered in a preset instruction table, and responses to these instructions, between the first operating system and second operating system. For instance, examples of such specified instructions include setting instructions indicating whether or not log information is to be transmitted to the second log management device, notification that log information has been produced (or notification that log information has been produced and stored in a specified storage regions) and the like. In other words, the contents of communications that are permitted between the first operating(s) and second operating system are limited in advance. Accordingly, for example, the manager of the first log management device cannot perform alterations or the like of log information stored in the second log management device.

In an embodiment of the present invention, the file server further comprises a discriminating information storage part which stores discriminating information that is used to discriminate whether or not the log information is to be transmitted to the second log management device, and the second log transmitting part transmits this log information to the second log management device via the second communications network in cases where an indication that this log information is to be transmitted to the second log management device is set in the discriminating information. Specifically, either a first mode in which the log information is managed only by the first log management device, or a second log mode in which the log information is respectively managed by the first log management device and second log management device, can be selected in accordance with the set content of the discriminating information.

In an embodiment of the present invention, the first operating system is connected via the first communications network to a first setting terminal for performing the change in settings in the first operating system, the second operating system is connected via the second communications network to a second setting terminal that is used to set the discriminating information, and the discriminating information cannot be manipulated from the first setting terminal.

In an embodiment of the present invention, the first log transmitting part transmits the log information to the first log management device in cases where the second log transmitting part transmits the log information to the second log management part. As a result, log information can be preferentially transmitted to and stored in the second log management device. Accordingly, for example, even if trouble should occur in the transmission of the log information to the first log management device, the log information can be managed in the second log management device.

In an embodiment of the present invention, the file server further comprises a shared storage part that is used by both the first operating system and the second operating system, the produced log information is stored in the shared storage part from the first operating system, and the second log transmitting part acquires the log information from the shared storage part on the basis of a storage completion notification that is input from the first operating system via the inter-operating-system communications part, and transmits this log information to the second management device via the second communications network. Log information can also be transmitted from the first operating system to the second operating system via the inter-operating-system communications part. However, in cases where the data quantity of the log information is large, the direct exchange of large quantities of data between the operating systems is undesirable from the standpoint of efficiency and the like. Accordingly, a shared storage part that can be respectively accessed by the first operating system and second operating system is provided, and log information is transferred from the first operating system to the second operating system via this shared storage part. Furthermore, this notation does not mean that the construction in which log information is directly exchanged between the respective operating systems is discarded.

In an embodiment of the present invention, the log information stored in the shared storage part is erased when the second log transmitting part transmits the log information acquired from the shared storage part to the second log management device. Specifically, each time that log information is transferred, this log information is erased; accordingly, the storage capacity of the shared storage part can be set at a small capacity. Furthermore, since unnecessary log information is not left in the shared storage part, alteration or the like of log information left in the shared storage part can be prevented.

In an embodiment of the present invention, the first operating system is provided in a plurality, and the log information producing part respectively produces log information for each of the first operating systems in cases where settings are changed in the respective first operating systems.

In an embodiment of the present invention, the file server further comprises a first transmission destination address storage part which stores the network address of the first log management device, and a second transmission destination address storage part which stores the network address of the second log management device, the first log transmitting part transmits the log information to the first log management device on the basis of a network address stored in the first transmission destination address storage part, and the second log transmitting part transmits the log information to the second log management device on the basis of a network address stored in the second transmission destination address storage part.

The file server log management system according to another aspect of the present invention is a log management system that is used to manage a log produced by a file server, this system comprising a file server in which a plurality of virtual operating systems and a management operating system are respectively operated, a kernel part which is disposed in the file server, and which is used for the respective transfer of information relating to log information between the plurality of virtual operating systems and the management operating system, a first communications network which is respectively connected to each of the virtual operating systems, a first log management device which is respectively connected to the first communications network, a first setting terminal which is respectively connected to the first communications network, a second communications network which is connected to the management operating system, a second log management device which is connected to the second communications network, a log information producing part which is respectively disposed in each of the virtual operating systems, and which produces log information in cases where settings are changed in the virtual operating systems, a first log transmitting part which is disposed in the file server, and which transmits the produced log information from the virtual operating system that is associated with the log information to the first log management device via the first communications network that is connected to the virtual operating system, and a second log transmitting part which is disposed in the file server, and which transmits the produced log information from the virtual operating system that is associated with the log information to the management operating system via the kernel part, and transmits the log information from the management operating system to the second log management device via the second communications network.

The file server log management system according to still another aspect of the present invention is a log management system that is used to manage a log produced by a file server, this system comprising a storage control device which has a file server in which a plurality of virtual operating systems and a management operating system are respectively operated, a kernel part which is disposed in the file server, and which is used for the respective transfer of information relating to log information between the plurality of virtual operating systems and the management operating system, a first communications network which is respectively connected to each of the virtual operating systems, a first log management device which is respectively connected to the respective first communications networks, a first setting terminal which is respectively connected to the first communications network, a second communications network which is connected to the management operating system, a second log management device which is connected to the second communications network, a second setting terminal which is connected to the second communications network, a log information producing part which is respectively disposed in each of the virtual operating systems, and which produces log information in cases where settings are changed in the virtual operating systems, a first log transmitting part which is disposed in the file server, and which transmits the produced log information from the virtual operating system that is associated with the log information to the first log management device via the first communications network that is connected to the virtual operating system, a discriminating information storage part which is disposed in the file server, and in which discriminating information that is used to discriminate whether or not the log information is to be transmitted to the second log management device is stored by manipulation of the second setting terminal, and a second log transmitting part which is disposed in the file server, and which transmits the produced log information from the virtual operating system that is associated with the log information to the management operating system via the kernel part, and transmits the log information from the management operating system to the second log management device via the second communications network, in cases where an indication that the log information is to be transmitted to the second log management device is set in the discriminating information, wherein the storage control device comprises a higher communications control part for communicating with higher devices, a lower communications control part for communicating with storage devices, and a cache memory part which is respectively used by the higher communications control part and the lower communications control part, and the file server is disposed in the higher communications control part.

The file server log management method according to another aspect of the present invention is a file server log management method for managing log information produced by a single file server in which a first operating system and a second operating system that is used to manage this first operating system respectively operate in parallel, wherein a first setting terminal that is used to change settings in the first operating system and a first log management device that is used to acquire and store the log information produced by the first operating system are connected to the first operating system via a first communications network, and a second log management device that is used to acquire and store the log information is connected to the second operating system via a second communications network that is separate from the first communications network, the method comprising the steps of producing and holding log information relating to changes in settings in cases where such settings are changed in the first operating system, discriminating whether or not the log information is to be transmitted to the second log management device by referring to preset discriminating information, transferring the log information from the first operating system to the second operating system in cases where an indication that the log information is to be transmitted to the second log management device is set in the discriminating information, transmitting the log information from the second operating system to the second log management device via the second communications network; and transmitting the log information from the first operating system to the first log management device via the first communications network in cases where no indication that the log information is to be transmitted to the second log management device is set in the discriminating information, or in cases where the transmission of the log information to the second log management device has been completed.

Here, in the step of producing and holding log information, the log information is stored in the shared storage part that is shared by the first operating system and second operating system, and the step in which the log information is transmitted from the first operating system to the second operating system via the kernel part may include a first sub-step in which the first operating system notifies the second operating system that the log information has been stored in the shared storage part, a second sub-step in which the second operating system reads out the log information from the shared storage part, and a third sub-step in which the second operating system erases the log information from the shared storage part.

Furthermore, the method may comprise a step in which the log information stored in the first log management device and the log information stored in the second log management device are respectively acquired, and a step in which the log information stored in the first log management device and the log information stored in the second log management device are compared, and a judgment is made as to whether or not the contents of both sets of information agree, following the step in which the log information is transmitted from the first operating system to the first log management device via the first communications network.

There are cases in which all or some of the means, functions and steps of the present invention can be constructed as computer programs that can be executed by a computer system. In cases where all or some of the constructions of the present invention are constructed from computer programs, the computer programs can be distributed as fixed programs in (for example) various types of storage media, or can be transmitted via a communications network.

BRIEF DESCRIPTION OF THE DRAWINGS

FIG. 7 is an explanatory diagram showing the transfer option management data base that is used to determine the transmission mode of the log data;

FIG. 8 is an explanatory diagram showing the log transfer destination management data base that is used by the virtual OS;

FIG. 11 is an explanatory diagram showing the log management data base;

FIG. 12 is an explanatory diagram showing the hardware construction of various devices on the on the side of the trunk network;

FIG. 14 is an explanatory diagram showing the table that is used to manage communications between the manager OS and the virtual OS;

DESCRIPTION OF THE PREFERRED EMBODIMENTS

Figure 1:
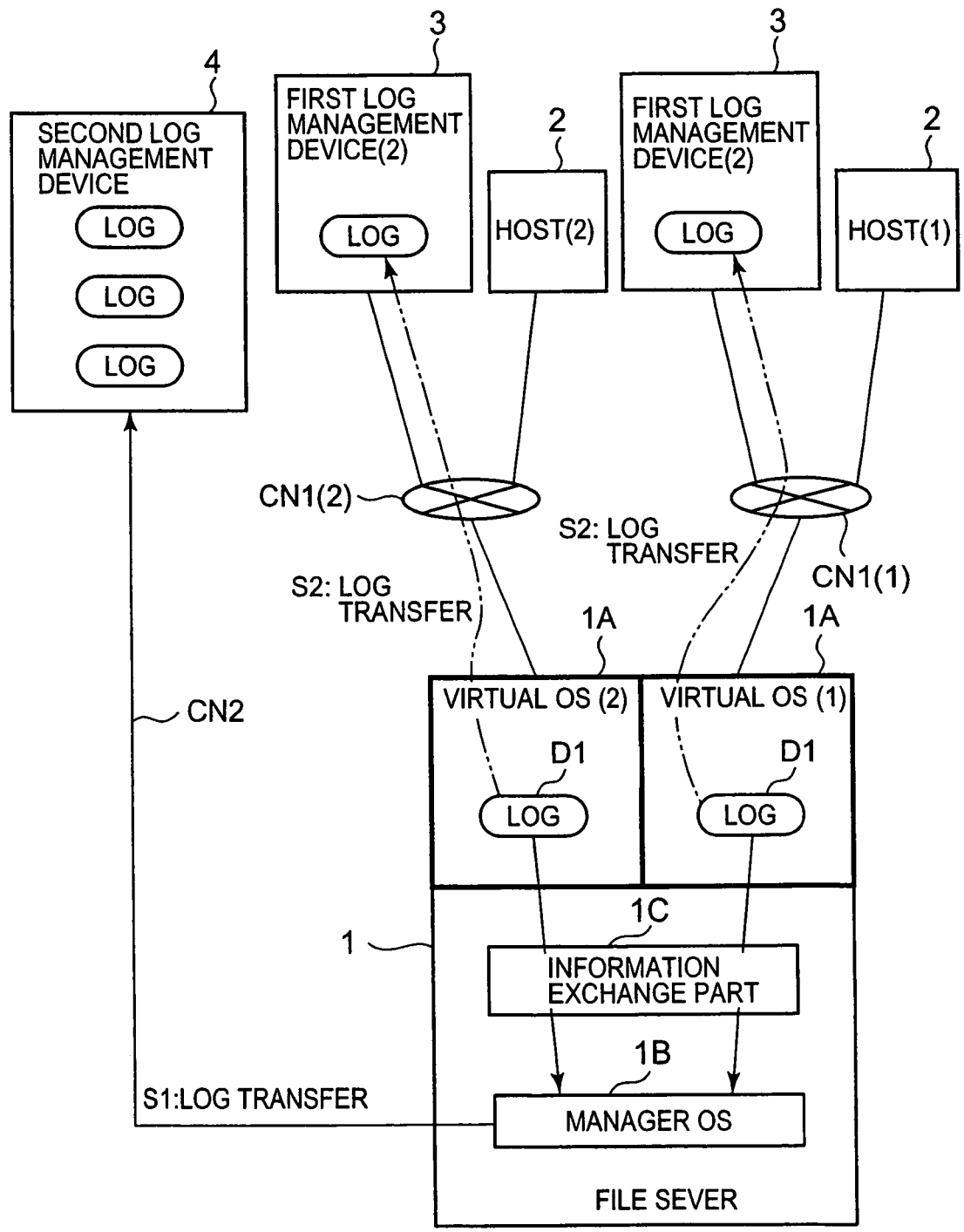
FIG. 1 is an explanatory diagram showing an outline of an embodiment of the present invention.

FIG. 1 is a structural explanatory diagram showing an overall outline of an embodiment of the present invention. In the present embodiment, the log information of a file management device (file server) is managed by multiplex management using a plurality of management devices that are separated from each other. Specifically, in the present embodiment, as will be described later, log information D1 produced in a virtual OS 1A is stored in log management devices 3 and 4 disposed on respectively different communications networks CN1 and CN2.

For example, this log management system can be constructed so that this system comprises a file server 1, a host computer (hereafter referred to as a "host") 2, a first log management device 3, and a second log management device 4.

The file server 1 manages files that are used by one or a plurality of hosts 2; for example, this file server 1 can be constructed as an NAS. For example, the file server 1 can be constructed so that this file server comprises a plurality of virtual OS 1A, a manager OS 1B that is used to manage the respective virtual OS 1A, and an information exchange part 1C that is used to perform specified communications between the respective virtual OS 1A and the manager OS 1B.

The virtual OS 1A are connected to respectively different first communications networks CN1. Furthermore, the hosts 2 and the second log management device 3 are respectively disposed on the respective first communications networks CN1. For example, the respective first communications networks CN1 can be produced in virtual terms by logically splitting a singe physical communications network.

The host 2(1) that is connected to one first communications network CN1(1) can access only the virtual OS (1) 1A that is connected to this first communications network CN1(1), and cannot access the virtual OS (2) 1A that is connected to the other first communications network CN1(2). Similarly, the host 2(2) that is connected to the other first communications network CN1(2) can access only the virtual OS (2) 1A that is connected to this other first communications network CN1 (2), and cannot access the virtual OS (1) 1A that is connected to the abovementioned first communications network CN1 (1).

Furthermore, first log management devices 3 are respectively disposed on the respective first communications networks CN1. The respective first log management devices 3 are used to acquire, store and manage the log information D1 that is produced in the respectively connected virtual OS 1A. Each first log management device 3 is managed by a respectively different manager.

The manager OS 1B respectively manages the respective virtual OS 1A. The manager OS 1B can exchange only specified information with the respective virtual OS 1A via the information exchange part 1C. This specified information is information relating to the transmission of the log information D1. For example, the information exchange part 1C can be constructed as a kernel.

The second communications network CN2 is connected to the manager OS 1B. The second communications network CN2 is a separate communications network that is physically separated from the respective first communications networks CN1. The second log management device 4 is connected to the manager OS 1B via the second communications network CN2. The second log management device 4 is a device that stores and manages the log information D1 respectively acquired by the manager OS 1B from the respective virtual OS 1A via the information exchange part 1C. The second log management device 4 manages all of the log information in the file server 1 in a unified manner. Here, the second log management device 4 is managed by a separate manager who is different from the managers of the respective first log management devices 3.

Next, the operation of the present embodiment will be described. When some change in the settings is made in the virtual OS 1A, log information D1 that records this change in the settings is produced. Examples of such changes in the settings include the creation, alteration, deletion and the like of file systems. Such log information D1 is independently produced by the respective virtual OS 1A.

The log information D1 that is produced in the respective virtual OS 1A is transfers to the manager OS 1B via the information exchange part 1C. The manager OS 1B transmits the respective sets of log information D1 to the second log management device 4 via the second communications network CN2 (S1). The second log management device 4 receives and stores the respective sets of log information D1.

Next, the respective virtual OS 1A respectively transmit the log information D1 to specified first log management devices 3 (S2). The respective first log management devices 3 receive and store the log information D1. Thus, the respective first log management devices 3 acquire and store only the log information D1 relating to the first communications networks CN1 to which these first log management devices 3 themselves are connected, while the second log management device 4 acquire and store all of the log information D1.

Thus, since the same log information D1 is managed by multiplex management using respectively different first log management devices 3 and the second log management device 4, in cases where the log information D1 in the first log management devices 3 is altered, this alteration can be discovered using the log information D1 in the second log management device 4, so that the reliability is improved.

In the present embodiment, the respective virtual OS 1A and the manager OS 1B are constructed so that communications can be performed via the information exchange part 1C. Accordingly, separate log management devices 3 and 4 can be respectively disposed on separate communications networks CN1 and CN2 that are separated from each other, so that the same log information D1 can be managed by multiplex management, without connecting a plurality of log management devices 3 and 4 on the same communications network CN1. Accordingly, the managers of the respective log management devices 3 and 4 can be made respectively different; furthermore, the manager of one log management device 3 can be prevented from making alterations or the like in the log information D1 stored in another log management device 4.

On the other hand, in cases where the respective log management devices 3 and 4 are disposed on the same communications network CN1, it is difficult from the standpoint of the efficiency of management work and the like to use different managers for the respective log management devices 3 and 4. The reason for this is as follows: namely, in cases where some type of trouble occurs in the communications network CN1 or in the respective devices 2 and 3 on the communications network 1, or in cases where programs are updated, it is more efficient if management work, saving or the like is performed by a single manager. However, if the respective log management devices 3 and 4 are disposed on the same communications network CN1, the possibility that the log information D1 that is managed by multiplex management may be altered by this single manager who has all of the various types of authorization relating to the communications network CN1 cannot be excluded. Furthermore, even in the case of an operation in which the managers of the respective log management devices 3 and 4 are respectively different people, since the respective log management devices 3 and 4 are present on the same communications network CN1, there is a possibility that a manager with bad intentions may utilize the weakness of one of the log management devices to intrude into another log management device.

In the present embodiment, a construction is used in which the first communications network CN1 and second communications network CN2 are physically separated, and respectively separate log management devices 3 and 4 are disposed on the respective communications networks CN1 and CN2. Accordingly, even if the managers of the respective communications networks CN1 and CN2 are designated as different persons, there is no drop in the efficiency of the management work; furthermore, the possibility of an intrusion from one communications network CN1 into the other communications network CN2 is suppressed, so that the reliability can be improved.

In the present embodiment, a construction is used in which the respective virtual OS 1A and the manager OS 1B are connected so that communications can be accomplished via the information exchange part 1C, and the information exchange part 1C allows only specified preset communications via the between the respective OS 1A and 1B. Accordingly, the alteration of both sets of multiplex-managed log information D1 can be prevented, so that the reliability is improved. The present embodiment will be described in detail below.

Example 1

Figure 2:
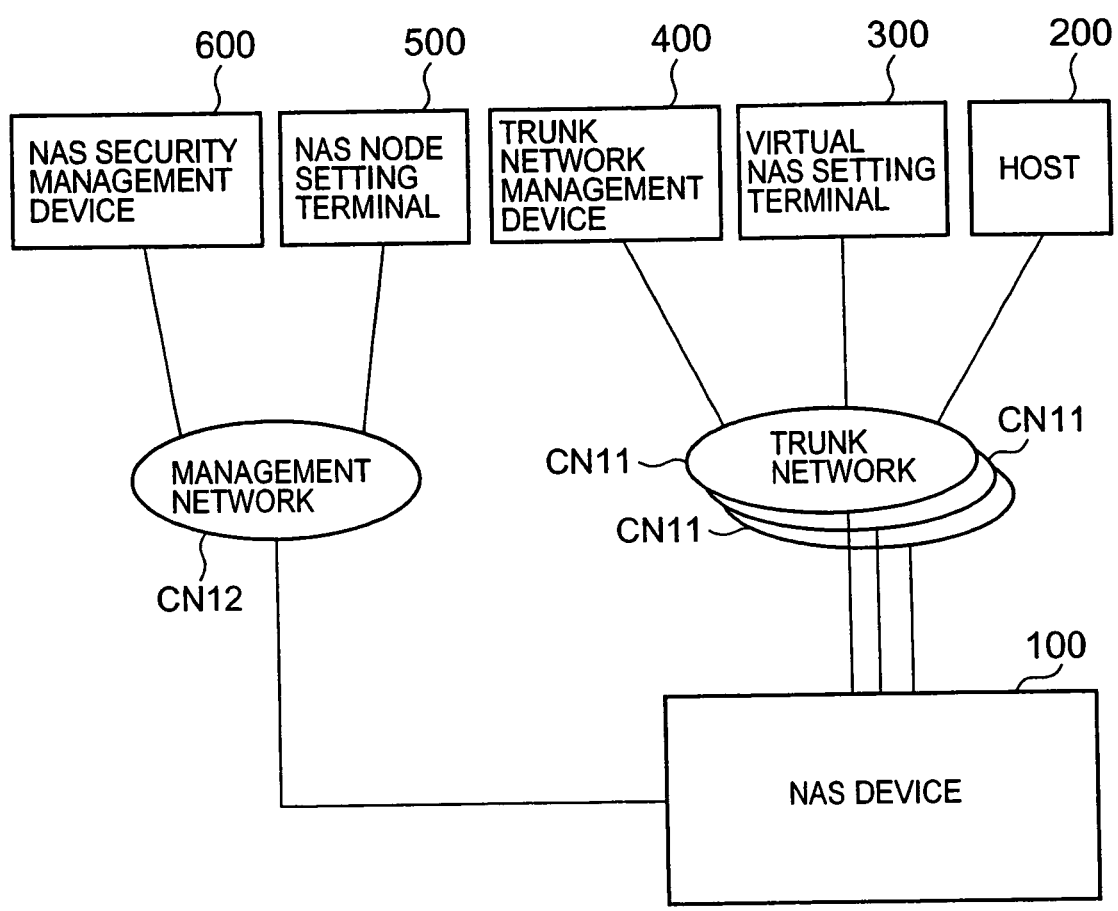
FIG. 2 is an explanatory diagram showing the overall construction of the log management system.

An embodiment of the present invention will be described in detail. FIG. 2 is an explanatory diagram showing the overall construction of the log management system. First, to describe the relationship between this figure and FIG. 1, the NAS device 100 in FIG. 2 corresponds to the file server 1 in FIG. 1, the host 200 in FIG. 2 corresponds to the host 2 in FIG. 1, the trunk network management device 400 in FIG. 2 corresponds to the first log management device 3 in FIG. 1, the NAS security management terminal 600 in FIG. 2 corresponds to the second log management device 4 in FIG. 1, the trunk network CN11 in FIG. 2 corresponds to the first communications network CN1 in FIG. 1, and the management network CN12 in FIG. 2 corresponds to the second communications network CN2 in FIG. 1.

The NAS device 100 is a computer device that provides an NAS service (file sharing service) to the host 200. A detailed example of the NAS device 100 will be further described later; however, this NAS device 100 is constructed so that the device has a controller function and a storage function.

A plurality of trunk networks CN11 are respectively connected to the NAS device 100, and one or a plurality of hosts 200, at least one virtual NAS setting terminal 300, and at least one trunk network management device 400, are respectively connected to each trunk network CN11.

For example, the NAS device 100 is devised so that a plurality of virtual NAS (virtual OS) can be set by logically splitting the internal computer resources (data processing capacity, memory and the like). The respective virtual NAS are respectively connected to separate trunk networks CN11. For example, the service provider that owns the NAS device 100 can supply the respective virtual NAS that are set in the NAS device 100 to respectively different users. For instance, such users include businesses, educational institutions, public agencies and the like.

The hosts 200 of the respective users are devised so that the virtual NAS assigned to these hosts 200 can be utilized via the respective trunk networks CN11; these hosts 200 cannot utilize virtual NAS assigned to other users. The virtual NAS setting terminal 300 performs setting operations such as the creation and deletion of file systems in the virtual NAS. Specifically, the respective users can alter the environments of the virtual NAS assigned to these users via the virtual NAS setting terminal 300.

The respective trunk networks CN11 can be constructed as virtual communications networks by logically splitting a network that is the same in physical terms. For instance, a plurality of virtual communications networks CN11 can be set on the same communications network by installing a really device such as a switching hub or the like on a communications network as in the case of communications networks known as VLAN (virtual LAN), and including tag information used to discriminate the respective virtual communications networks in the communications packets.

The respective trunk networks CN11 are managed by the respective users, and the log information that is produced by the respective virtual NAS is stored in the trunk network management devices 400 that are connected to the respective trunk networks CN11. Log information may be spontaneously transmitted to the trunk network management devices 400 from the respective virtual NAS, or may be transmitted to the trunk network management devices 400 from the virtual NAS in response to requests from the trunk network management devices 400.

An NAS node setting terminal 500 and an NAS security management terminal 600 are respectively connected to the NAS device 100 via the management network CN12. The NAS node setting terminal 500 is a computer terminal that is used to perform various types of setting operations relating to the NAS device. For example, the NAS node setting terminal 500 can send instructions to the NAS device 100 regarding the settings of the virtual NAS, virtual networks and the like.

The NAS security management terminal (hereafter abbreviated to "security management terminal" in some cases) 600 respectively acquires and stores respective sets of log information produced in the NAS device 100. In the same manner as described above, the manager OS 132 may gather log information from the respective virtual OS 133 and spontaneously transmit this log information to the security management terminal 600, or may transmit respective sets of log information to the security management terminal 600 in response to requests from the security management terminal 600.

Figure 3:
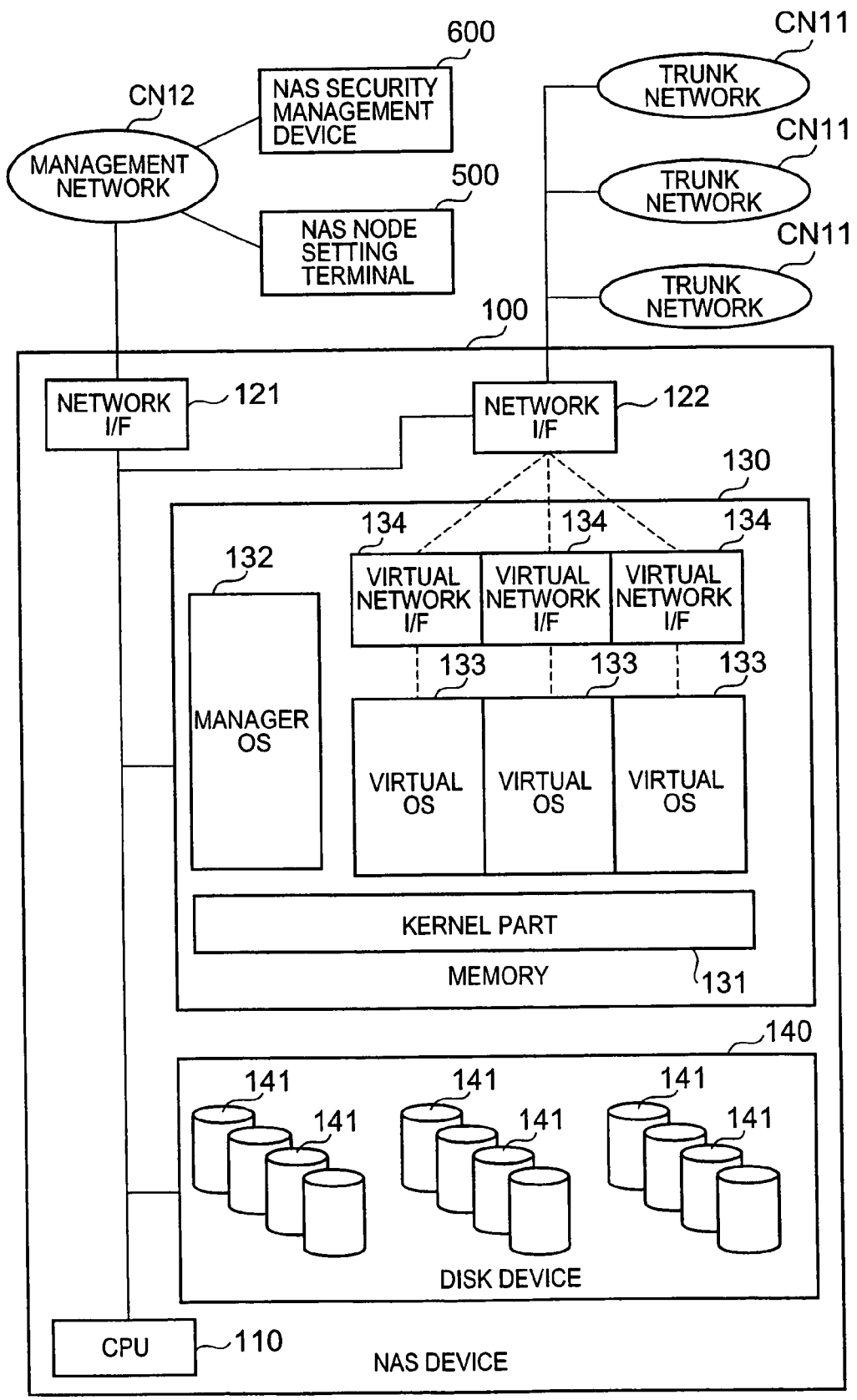
FIG. 3 is an explanatory diagram showing the construction of the NAS device.

FIG. 3 is a block diagram showing the construction of the NAS device 100. For example, the NAS device can be constructed so that this device comprises a CPU (central processing unit) 110, a plurality of interfaces (interface is hereafter abbreviated to "I/F") 121 and 122, a memory 130, and a disk device 140.

The CPU 110 controls the overall operation of the NAS device 100. The CPU realizes specified functions by reading in and executing respective programs described later. The network I/F 121 is an I/F that is used to for connection to the management network CN12. The other network I/F 122 is an I/F used for connection to the respective trunk networks CN11. For example, the respective network I/Fs 121 and 122 can be constructed in the manner of Gigabit class LAN cards. The respective network I/Fs 121 and 122 are respectively constructed as physically different I/F circuits.

For example, information relating to the kernel part 131, the manager OS 132, the virtual OS 133, and the virtual network I/F 134, is stored in the memory 130. The kernel part 131 corresponds to the "inter-operating-system communications part" or "information exchange part". The kernel part 131 performs preset specified communications between the respective virtual OS 133 corresponding to the "first operating systems" and the manager OS 132 corresponding to the "second operating system". The specified communications will be described later; for example, such communications include instructions for the transmission settings of the log information, and notifications that log information has been produced or stored.

The memory 130 is divided into sections for respectively storing the manager OS 132 and the respective virtual OS 133. The respective sections are used in a non-exclusive manner. Specifically, as a rule, the respective virtual OS 133 cannot access the storage regions of other sections. As a result, the independence of the respective virtual OS 133 is maintained, and the confidentiality of the respective users is protected.

The manager OS 132 is an operating system that is used to manage the respective virtual OS 133. This manager OS 132 is constructed so that this operating system can communicate with the NAS node setting terminal 500 and security management terminal 600 via the management network CN12. As will be described later, the manager OS 132 gathers log information from the respective virtual OS 133, and transmits this log information to the security management terminal 600.

For example, the virtual OS 133 are prepared for each user. The respective virtual OS 133 can be constructed as operating systems of respectively different types. Alternatively, a plurality of virtual OS 133 can be assigned to the same user. A plurality of file systems can be respectively installed in each virtual OS 133.

The respective virtual OS 133 are respectively connected to the virtual network I/Fs 134, and are connected to the trunk networks CN11 via the respective virtual network I/Fs 134. The physical communications network is separated into a plurality of logical trunk networks CN11 by the respective virtual network I/Fs 134, and is used in this form. For example, discriminating information that is used to discriminate the virtual network I/Fs 134 is set in the respective virtual network I/Fs beforehand. The respective virtual network I/Fs 134 receive only packets having discriminating information (tag information) addressed to these I/Fs 134 themselves from the communications network. Furthermore, the respective virtual network I/Fs 134 add their own discriminating information to packets, and send these packets out to the communications network.

In the figures, a configuration is shown in which three virtual network I/Fs 134 are caused to correspond to a single physical network I/F 122, and virtual OS 133 are respectively connected to the respective virtual network I/Fs 134 in a one-to-one correspondence. However, the present invention is not limited to this; a plurality of virtual network I/Fs 134 may also be caused to correspond to the same virtual OS 133. Furthermore, a construction may also be used in which a plurality of physical network I/Fs 122 are installed, and one or a plurality of virtual network I/Fs 134 are caused to correspond to each of these physical network I/Fs 122.

The disk device 140 comprises a plurality of disk drives 141, and provides a storage region based on (for example) an RAID (redundant array of independent disks). The disk device 140 need not be installed inside the housing of the NAS device 100; this disk device 140 may also be installed in a separate housing from the NAS device 100. Furthermore, as will be described later, the NAS device 100 may also be constructed as a control board mounted in a disk array device. Here, for example, various types of storage devices such as hard disk drives, semiconductor memory drives, optical disk drives, optical-magnetic disk drives or the like can be used as the disk drives 141.

Figure 4:
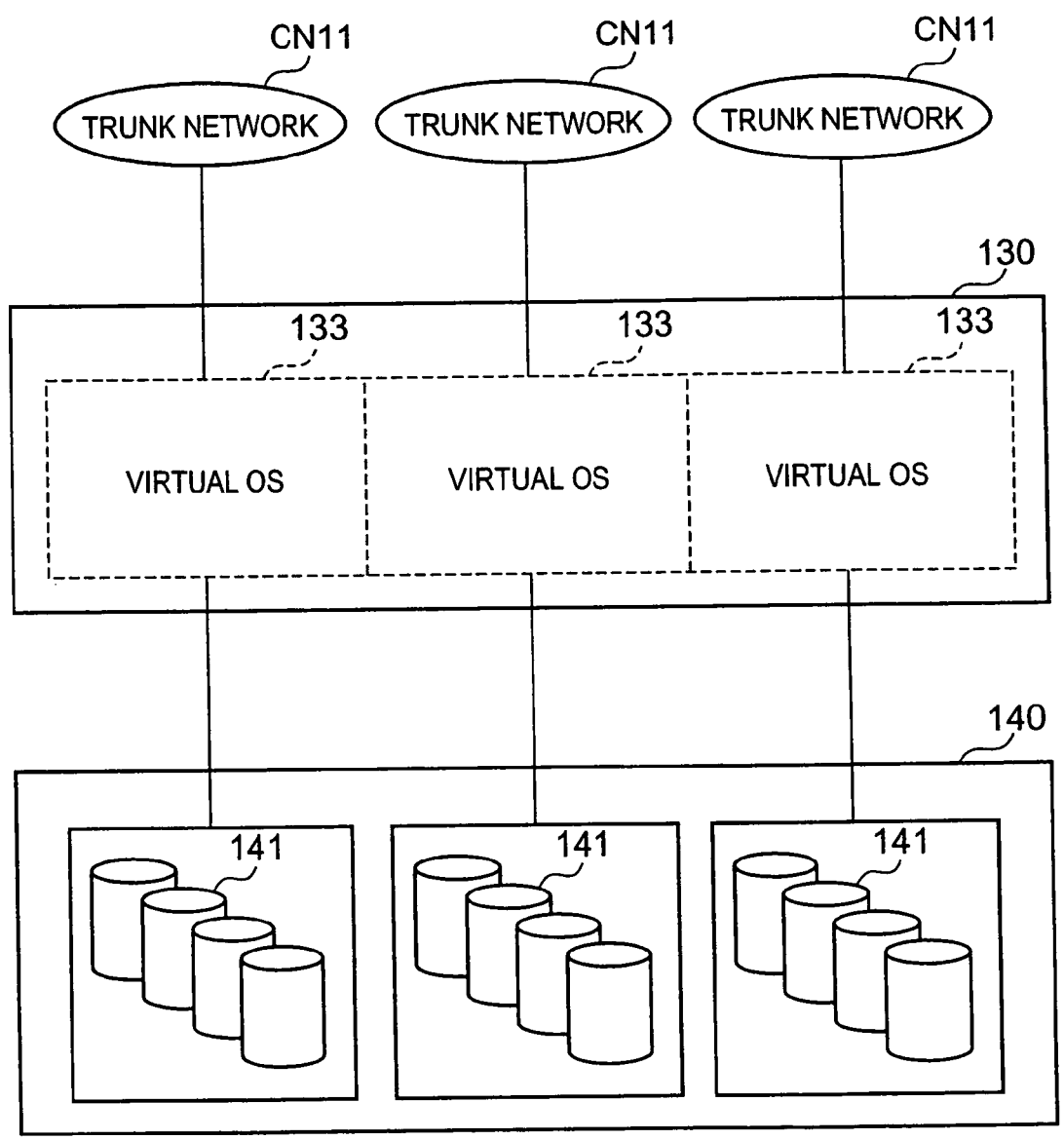
FIG. 4 is an explanatory diagram showing in model form how memory resources and disk resources are assigned to the virtual OS.

FIG. 4 is a model diagram showing how a memory 130 and disk device 140 are respectively assigned to each virtual OS 133. In FIG. 4, the manager OS 132, kernel part 131 and the like are omitted. A virtual OS 133 is assigned to each section of the memory 130. Furthermore, storage regions (logical volumes) belonging to the disk device 140 are also respectively assigned to each virtual OS 133. The respective virtual OS 133 can use only memory resources and disk resources that have been assigned to these virtual OS 133 themselves. Furthermore, dedicated memory resources and disk resources are also assigned to the manager OS 132. Moreover, the shared disk region 145 described later is set as a disk resource that can be respectively utilized by the manager OS 132 and respective virtual OS 133.

Figures 5, 6:
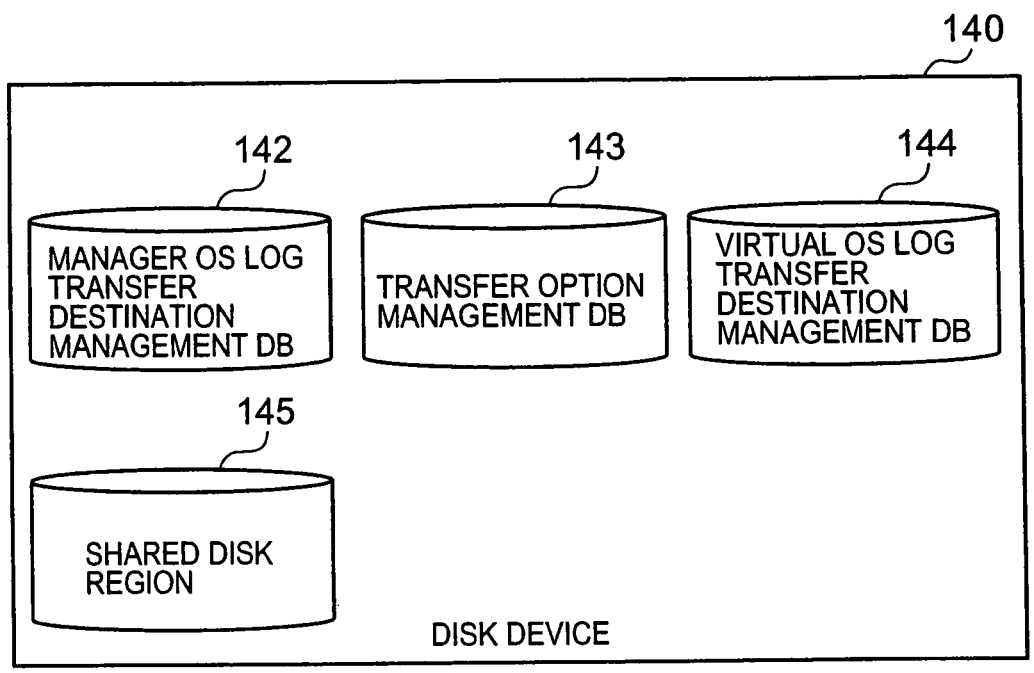
FIG. 5 is an explanatory diagram showing the construction of the disk device.
FIG. 6 is an explanatory diagram showing the log transfer management data base used by the manager OS.

FIG. 5 is an explanatory diagram showing the construction of the disk device 140 in model form. The term "data base" will hereafter be abbreviated to "DB". In relation to the transfer of log information, for example, a manager OS log transfer destination management DB 142, a transfer option management DB 143, a virtual OS log transfer destination management DB 144, and a shared disk region 145, can be installed in the disk device 140.

The manager OS log transfer destination management DB 142 is used by the manager OS 132. This log transfer destination management DB 142 is used in cases where the manager OS 132 transmits log information respectively gathered from the respective virtual OS 133 to an external device (security management terminal 600).

Similarly, the virtual OS log transfer destination management DB 144 is used by the respective virtual OS 133. For example, such a log transfer destination management DB 144 is respectively prepared for each virtual OS 133. By referring to the log transfer destination management DB 144, the respective virtual OS 133 transmit log information to the trunk network management devices 400 connected to these virtual OS 133. Furthermore, it would also be possible to use a construction in which a log transfer destination management DB 144 corresponding to a plurality of virtual OS 133 is provided instead of installing a log transfer destination management DB 144 for each virtual OS 133.

The transfer option management DB 143 is used by the respective virtual OS 133, and manages information that is used to select the management mode of the log information. The transfer option management DB 143 can be set only by instructions from the NAS node setting terminal 500. Specifically, the management mode of the log information can be altered by instructions from the side of the management network CN12; however, the virtual NAS setting terminal 300 on the side of the trunk network CN11 cannot alter the management mode of the log information.

Here, two types of modes are prepared as log information management modes. The first mode is a non-redundant management mode in which the log information produced in the respective virtual OS 133 is transmitted only to the respective trunk network management devices 400 and managed. The second mode is a redundant management mode in which the log information produced in the respective virtual OS 133 is respectively transmitted to both the respective trunk network management devices 400 and security management terminal 600, and managed.

The shared disk region (hereafter referred to as the "shared disk" in some cases) 145 is used to transfer log information between the management OS 132 and the respective virtual OS 133.

FIG. 6 is an explanatory diagram showing the construction of the manager OS log transfer destination management DB 142. For example, this log transfer destination management DB 142 is constructed by associating network addresses in the security management terminal 600, types of protocols used in the transfer of log information, and port numbers used in the transfer of log information.

FIG. 7 is an explanatory diagram showing the construction of the transfer option management DB 143. For example, the transfer option management DB 143 shown in FIG. 7 is constructed by associating numbers used to discriminate the respective virtual OS 133, and transfer flags. The transfer flags are items of control information that indicate whether or not log information in the virtual OS 133 is also to be transmitted to the security management terminal 600. In cases where the transfer flag is set as "1", the log information is respectively transmitted to the trunk network management device 400 and security management terminal 600 (second mode). In cases where the transfer flag is reset to "0", the log information is transmitted only to the trunk network management device 400, and is not transmitted to the security management terminal 600 (first mode).

Furthermore, in FIG. 7, the transfer option management DB 143 is indicated as being shared by the respective virtual OS 133; however, it would also be possible to install a transfer option management DB 143 for each virtual OS 133. In this case, there is no need for numbers to discriminate the virtual OS 133.

FIG. 8 is an explanatory diagram showing the construction of the virtual OS log transfer destination management DB 144. For example, this virtual OS log transfer destination management DB 144 is constructed by associating network addresses in the trunk network management device 400, types of protocols used in the transfer of log information, and port numbers used in the transfer of log information.

Figure 9:
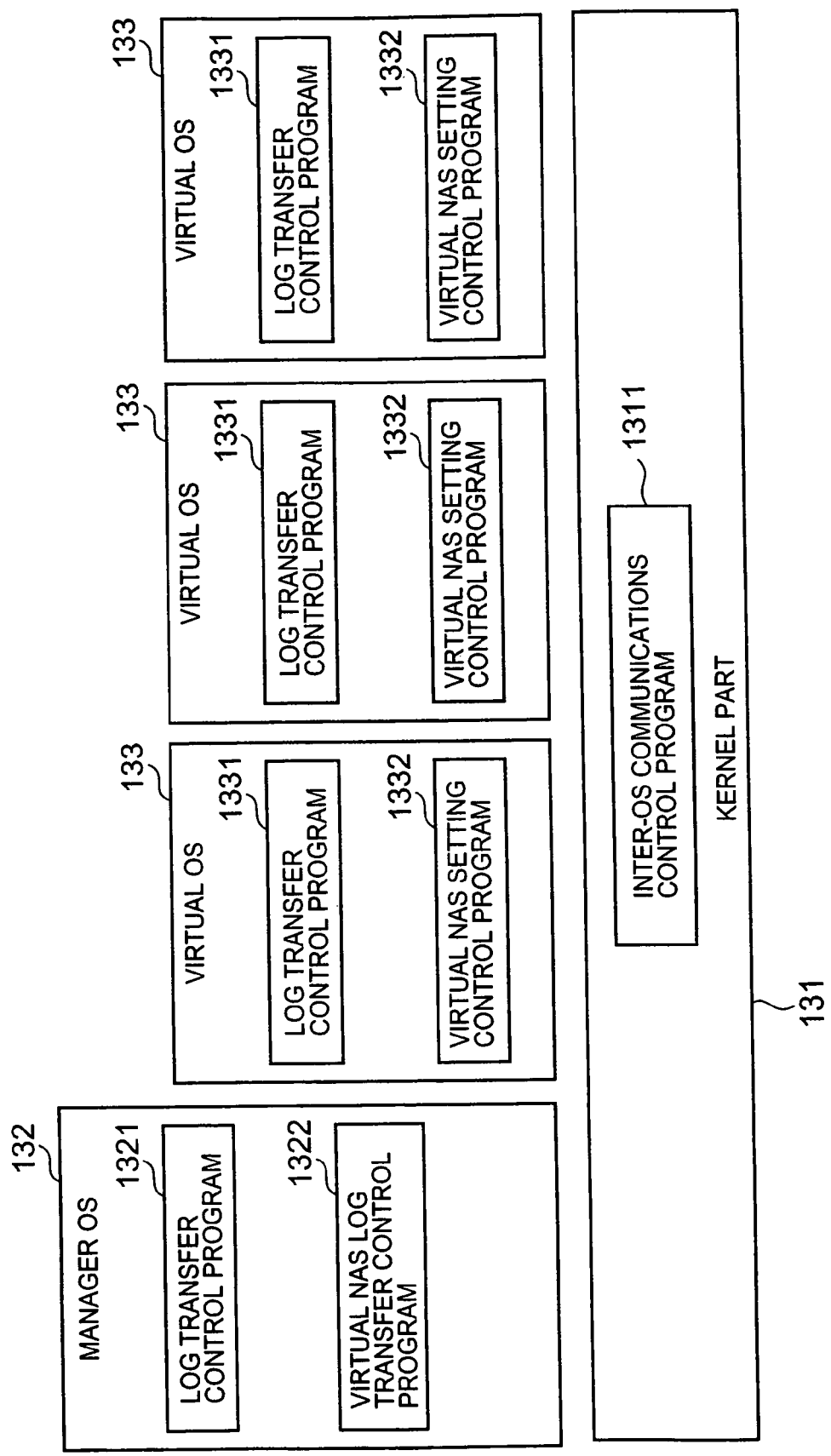
FIG. 9 is an explanatory diagram showing the program construction of the NAS device.

FIG. 9 is an explanatory diagram showing in model form the program construction of the NAS device 100. FIG. 9 shows only the main programs relating to the transmission of the log information. In actuality, various types of programs that are required in order to realize NAS functions are provided.

The kernel part 131 executes an inter-operating-system communications control program 1311. This program 1311 performs the exchange of information between the manager OS 132 and the respective virtual OS 133.

The manager OS 132 executes a log transfer control program 1321 and a virtual NAS log transfer control program 1322. The log transfer control program 1321 transmits the log information gathered from the virtual OS 133 via the kernel part 131 to the security management terminal 600 on the basis of the transfer destination network addresses and the like registered in the log transfer destination management DB 142.

The virtual NAS log transfer control program 1322 issues requests for the alteration of the contents of the transfer flag on the basis of requests from the NAS node setting terminal 500. These issued requests are input into the kernel part 131. Furthermore, this program 1322 instructs the log transfer control program 1321 to transmit log information. After receiving this instruction, the log transfer control program 1321 transmits the log information gathered from the virtual OS 133 via the kernel part 131 to the security management terminal 600.

The respective virtual OS 133 execute a log transfer control program 1331 and a virtual NAS setting control program 1332.

The log transfer control program 1331 operates on the basis of the contents of the transfer flag registered in the transfer option management DB 143. In cases where "1" is set in the transfer flag, this program 1331 issues a request to the kernel part 131 to transfer log information to the side of the manager OS 132. Furthermore, this program 1331 also has the function of altering the contents of the transfer flag on the basis of requests from the kernel part 131.

The virtual NAS setting control program 1332 alters the settings of the virtual OS 133 on the basis of instructions from the managers of these virtual OS 133. Furthermore, this program 1332 produces log information relating to the alteration of these settings. Moreover, this program 1332 transmits this produced log information to the trunk network management device 400 on the basis of the transfer destination network addresses and the like accumulated in the virtual NAS log transfer destination management DB 144.

The respective programs 1311, 1321, 1322, 1331 and 1332 described above are executed by the CPU 110. When executing the respective programs, the CPU 110 uses the memory 130 as a working area.

Figure 10:
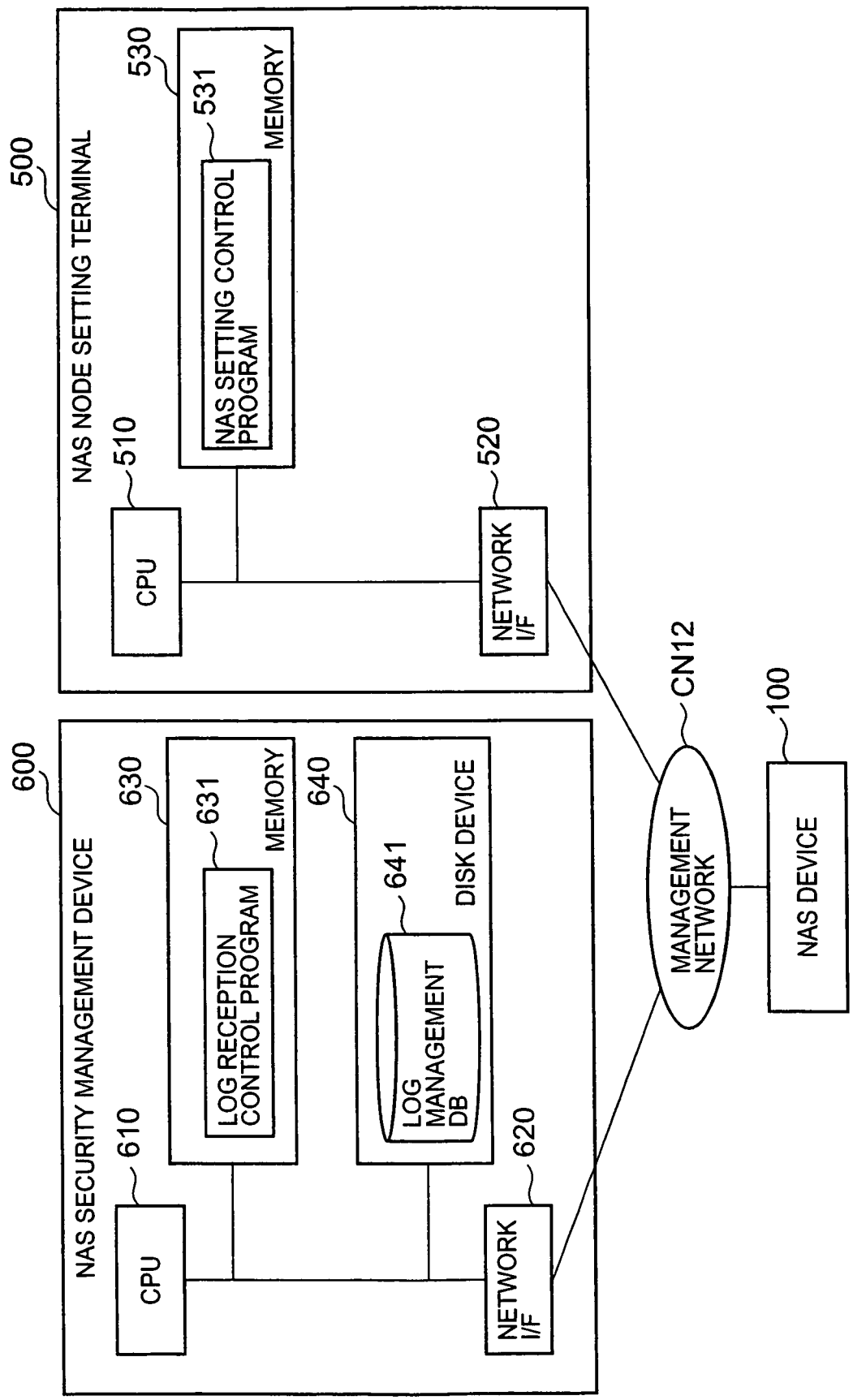
FIG. 10 is an explanatory diagram showing the hardware construction of various devices on the side of the management network.

FIG. 10 is an explanatory diagram showing the hardware construction of the respective devices 500 and 600 on the side of the management network CN12. For example, the NAS node setting terminal 500 may comprise a CPU 510, network I/F 520, and memory 530. Furthermore, a user interface that is used by the manager on the side of the management network CN12 is installed in the NAS node setting terminal.

The network I/F 520 connects the NAS node setting terminal 500 to the management network CN12. As a result, the NAS node setting terminal 500 is connected to the NAS device 100 via the management network CN12.

An NAS setting control program 531 is stored in the memory 530. This program 531 is read into the CPU 510 and executed. As a result, various types of setting alterations are performed for the NAS device 100. For example, virtual OS 133 can be newly produced, or virtual OS 133 that have been produced can be deleted, by this program 531. Furthermore, the association of virtual OS 133 and virtual network I/Fs 134, the association of virtual network I/Fs 134 and network I/Fs 122 and the like can be altered by this program 531.

Next, the construction of the security management terminal 600 will be described. For example, the security management terminal 600 may comprise a CPU 610, network I/F 620, memory 630 and disk device 640. Furthermore, a user interface that is used by managers on the side of the management network CN12 is installed in the security management terminal 600.

The network I/F 620 connects the security management terminal 600 to the management network CN12. As a result, the security management terminal 600 is connected to the NAS device 100 via the management network CN12.

A log reception control program 631 is stored in the memory 630. This program 631 is read into the CPU 610 and executed. As a result, the security management terminal 600 receives the respective sets of log information that are transmitted from the manager OS 132 via the network I/F 620.

A log management DB 641 that is used to manage the respective sets of log information received from the manager OS 132 is disposed in the disk device 640. The log reception control program 631 stores the log information received from the manager OS 132 in the log management DB 641.

FIG. 11 is an explanatory diagram showing the construction of the log management DB 641. The log management DB 641 shown in FIG. 11 can handle a plurality of NAS devices 100. The log management DB 641 is constructed so that this data base includes three types of information (roughly classified).

The first type of information comprises NAS node numbers (in the figures, discriminating numbers are indicated as "#") that are used to discriminate the plurality of NAS devices 100. The security management terminal 600 can be respectively connected to a plurality of NAS devices 100, so that all of the log information acquired from the respective NAS 100 can be managed in a unified manner.

The second type of information is information relating to the respective virtual OS 133 disposed in each NAS device 100. For example, such information relating to the virtual OS 133 may include virtual OS names used to discriminate the respective virtual OS 133, the date and time at which operation of the virtual OS 133 is initiated (such date and time may be recorded as year, month, day, hour, minute and seconds; same below), the date and time at which the operation of the virtual OS 133 is ended, and the status of the virtual OS 133. For instance, examples of the status of the virtual OS 133 include "in operation (normal operating state)", "stopped", "in recovery from trouble" and the like.

The third type of information is information relating to the respective file systems disposed in each virtual OS 133. One or more file systems can be installed in each virtual OS 133. The types of file systems that are created can be determined by the user using the virtual OS 133. For example, information relating to the file systems may include file system names used to discriminate the respective file systems, the data and time at which operation of the file system is initiated, the date and time at which the operation of the file system is ended, the status of the file system, and the type of the file system.

Here, for example, the status of the file system may include "in operation (normal operating state)", "stopped", "in recovery from trouble", "being backed up" and the like. Furthermore, for example, types of file systems include "ordinary", "WORM" and the like. WORM (write once read many) refers to a state in which the writing of data is permitted only once. For example, medical treatment information produced by medical institutions or the like, and transaction information produced by financial institutions or the like, must be stored for a specified period of time that is determined by law. Furthermore, there is a strict requirement for the prevention of falsification (deletion or alteration) of such data. Such important data can be properly managed by being stored in a WORM type file system.

Furthermore, most of the construction of the log management DB 641 shown in FIG. 11 is shared with the construction of the log management DB 444 described later. In the security management terminal 600, all of the log information of a plurality of NAS devices 100 is managed in a unified manner, while in the case of the trunk network management device 400, it is sufficient if only the log information of the respectively connected virtual OS 133 is managed. Accordingly, the NAS node numbers in the log management DB 641 of the security management terminal 600 are unnecessary in the log management DB 441 of the trunk network management device 400.

FIG. 12 is an explanatory diagram showing the hardware construction of the respective devices 300 and 400 on the side of the trunk network CN11. For example, the virtual NAS setting terminal 300 may comprise a CPU 310, network I/F 320 and memory 330. Furthermore, a user interface that is used by managers on the side of the trunk network CN11 is disposed in the virtual NAS setting terminal 300.

The network I/F 320 connects the virtual NAS setting terminal 300 to the trunk network CN11. As a result, the virtual NAS setting terminal 300 is connected to the NAS device 100 via the trunk network CN11.

A virtual NAS setting control program 331 is stored in the memory 330. This program 331 is read into the CPU 310 and executed. As a result, the constructions of the virtual OS 133 that are connected to the virtual NAS setting terminal 300 via the trunk network CN11 are altered. For example, new file systems can be created in the virtual OS 133, file systems that have been created can be deleted, or the like.

Next, the hard disk construction of the of the trunk network management device 400 will be described. For example, the trunk network management device 400 may comprise a CPU 410, network I/F 420, memory 430, and disk device 440. Furthermore, a user interface that is used by managers on the side of the trunk network CN11 is disposed in the trunk network management device 400.

The network I/F 420 connects the trunk network management device 400 to the trunk network CN11. As a result, the trunk network management device 400 is connected to the NAS device 100 via the trunk network CN11.

A log reception control program 431 is stored in the memory 430. This program is read into the CPU 410 and executed. As a result, log information received from the virtual NAS 133 by the trunk network management device 400 is stored it the log management DB 441 disposed inside the disk device 440.

Next, the construction of the hosts 200 will be described. For example, each host 200 may comprise a CPU 210, network I/F 220 and memory 230. Application programs 231 are stored in the memory 230. Examples of application programs 231 include, for instance, sales management programs, customer management programs, email management programs and the like.

Figure 13:
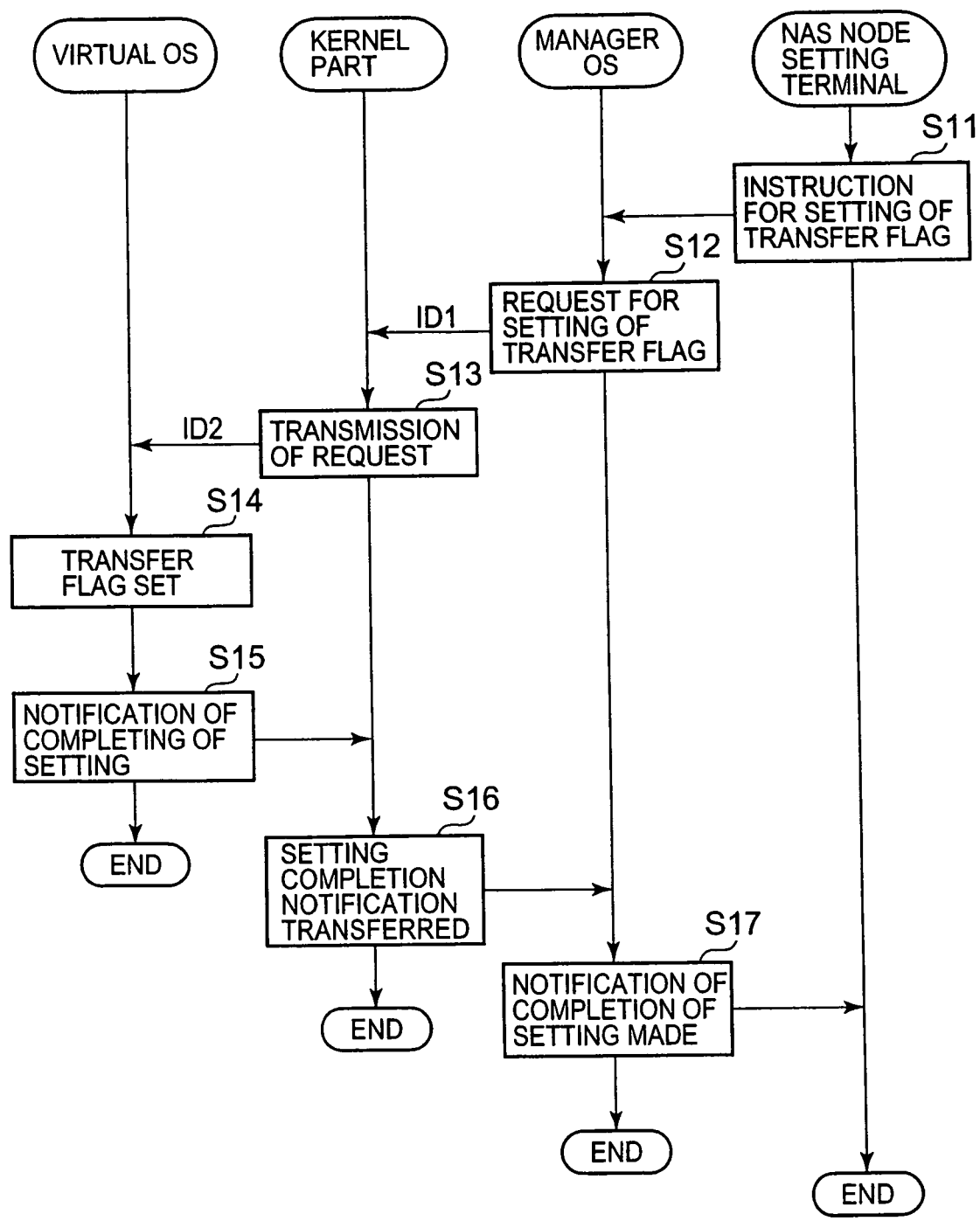
FIG. 13 is a flow chart of the processing that is used to set the transmission mode of the log information.

Next, the operation of the log management system will be described. FIG. 13 is a flow chart showing the processing that is used to set the log information transfer mode. Furthermore, in the following description, "step" will be abbreviated to "S".

A manager on the side of the management network CN12 issues an instruction to set the transfer flag via the NAS node setting terminal 500 (S11). Here, a case in which the log information transfer mode is set as the second mode will be described as an example. In cases where the transfer mode is set as the second mode, the transfer flag that is stored in the transfer option management DB 143 may be set as "1". Furthermore, in cases where this transfer mode is set as the first mode, this transfer flag may be reset to "0".

When the manager OS 132 receives instructions from the NAS node setting terminal 500 via the management network CN12, the manager OS 132 issues a request for the transfer flag to be set as "1" by the virtual OS 133 (S12). This request is input into the kernel part 131 from the manager OS 132, and is transmitted to the virtual OS 133 via the kernel part 131.

The request to set the transfer flag is issued on the basis of the inter-OS communications management table T1 shown in FIG. 14. Accordingly, reference will first be made to FIG. 14. For example, the inter-OS communications management table T1 is stored in a specified location in the memory 130. More concretely, this table is stored inside the inter-OS communications control program 1311 of the kernel part 131. This inter-OS communications management table T1 is used by the manager OS 132 and virtual OS 133 to exchange information (instructions and notifications) via the kernel part 131.

In this management table T1, the reception of information and the transfer (request) of this received information are registered so as to form a set. One set includes discriminating information (reception ID) for the received information, information that specifies the reception source, discriminating information for the requested information (transferred information) (request ID), and information that specifies the request destination (information transfer destination). The first set described in the first line of the management table T1 indicates information that is used to transmit the setting of the transfer flag; this comprises reception ID 1 and request ID 2. Reception ID 1 indicates that this is information requesting the setting of the transfer flag, while request ID 2 indicates that this is information transferring a setting request of the transfer flag. Reception ID 1 can be received only from the manager OS 132 registered as a reception source, while request ID 2 can perform transfers only to the virtual OS 133 registered as a request destination.

The second set described in the second line of the management table T1 indicates information that is used to transmit an indication that the setting of the transfer flag has been completed. This set comprises reception ID 3 and request ID 4. In the same manner as described above, reception ID 3 can be received only from the virtual OS 133 registered as reception sources, while request ID 4 can perform transfers only to the manager OS 132 registered as a request destination. The information of the second set is positioned as responses to the first set. Accordingly, the reception source of the reception ID 1 and the request destination of the request destination of the request ID 4 are the same, and the request destination of the request ID 2 and reception source of the reception ID 3 are the same.

The third set described in the third line of the management table T1 indicates information that is used to send an instruction to transmit log information to the security management terminal 600; this information comprises reception ID 5 and request ID 6. The reception ID 5 indicates that the information is information requesting the transmission of log information to the security management terminal 600. The request ID 6 indicates that the information is information for transferring this log information transmission request. Reception ID 5 can be received only from virtual OS 133 that are registered as reception sources. Request ID 6 can be transferred only to the manager OS 132 registered as a request destination.

The fourth set described in the fourth line of the management table T1 is positioned as a response to the third set, and comprises reception ID 7 and request ID 8. The information of the fourth set is used to transmit a report that log information has been transmitted from the manager OS 132 to the security management terminal 600. Reception ID 7 can be received only from the manager OS 132 registered as a reception source. Request ID 8 can be transferred only to virtual OS 133 registered as request destinations. The reception sources of ID 5 and request destinations of ID 8 are the same, and the request destinations of ID 6 and reception sources of ID 7 are the same.

The description now returns to S12 in FIG. 13. When the kernel part 131 receives an instruction to set the transfer flag, the kernel part 131 recognizes this instruction as information of the reception ID 1. The kernel part 131 refers to the inter-OS communications management table T1, acquires the request ID 2 that forms the same set with the reception ID 1 from this management table T1, and sends an instruction (request) to set the transfer flag to the virtual OS 133 (S13).

Thus, instructions from the manager OS 132 are relayed via the kernel part 131 and transmitted to the virtual OS 133. When the virtual OS 133 confirm instructions from the manager OS 132, the virtual OS 133 set the transfer flag of the transfer option management DB 143 as "1" (S14). The virtual OS 133 then notify the kernel part 131 that the setting of the transfer flag has been completed (S15). When the kernel part 131 recognizes the transfer flag setting completion notification as information of the reception ID 3, the kernel part 131 transfers this setting completion notification to the manager OS 132 by means of the request ID 4 (S16).

When the manager OS 132 receives the setting completion notification from the virtual OS 133 via the kernel part 131, the manager OS 132 notifies the NAS node setting terminal 500 that the transfer flag setting processing has been completed (S17).

Furthermore, similar processing can also be performed in cases where the transfer flag is reset to "0". In such cases, a set consisting of the reception ID and request ID used for resetting is added to the management table T1. Alternatively, a construction may also be used in which an instruction for the setting of the transfer flag is sent from the NAS node setting terminal 500, and the value of the transfer flag is alternately switched between "0" and "1".

Figure 15:
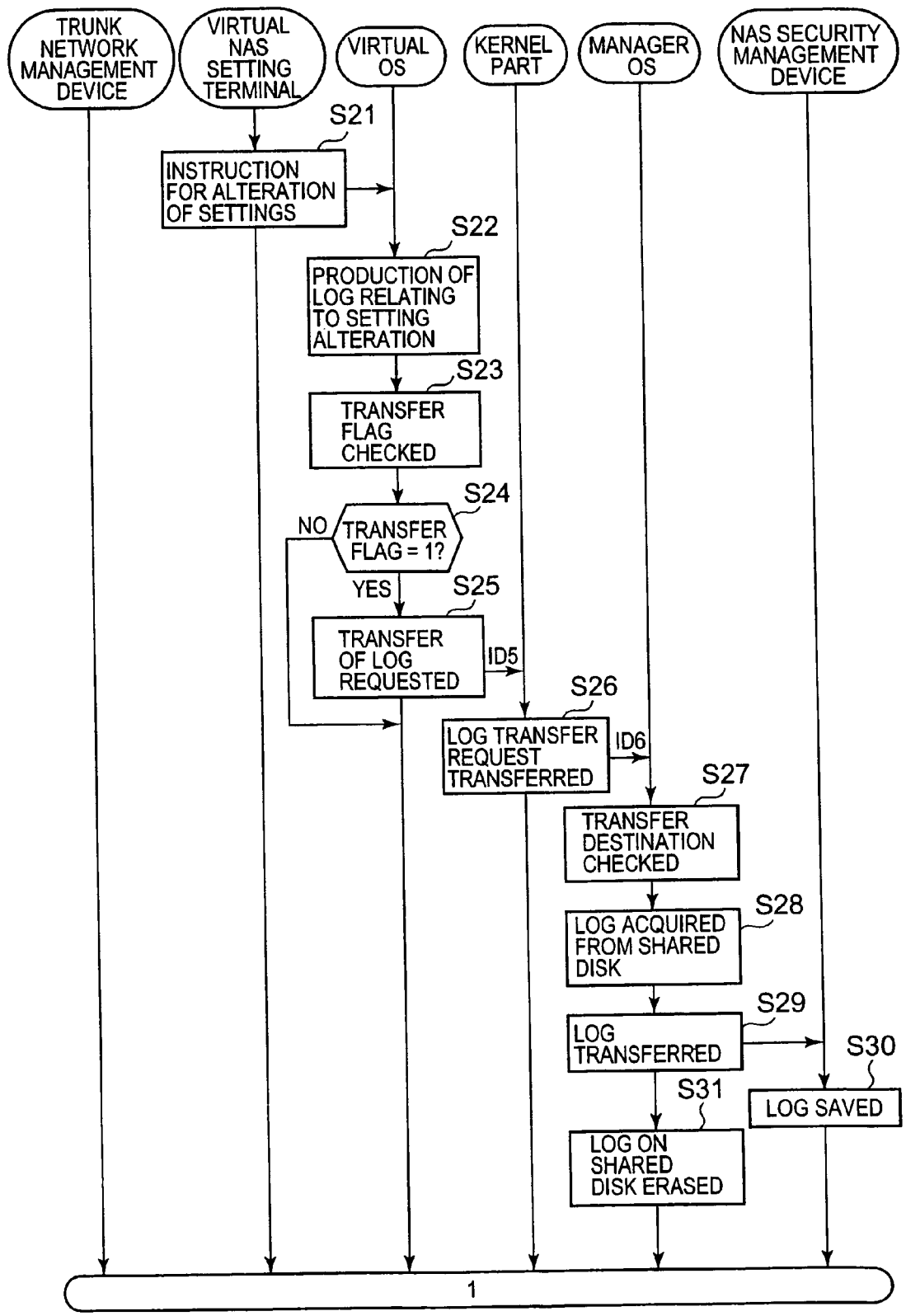
FIG. 15 is a flow chart showing the processing that transmits the log information produced in the virtual OS to an external management device.
Figure 16:
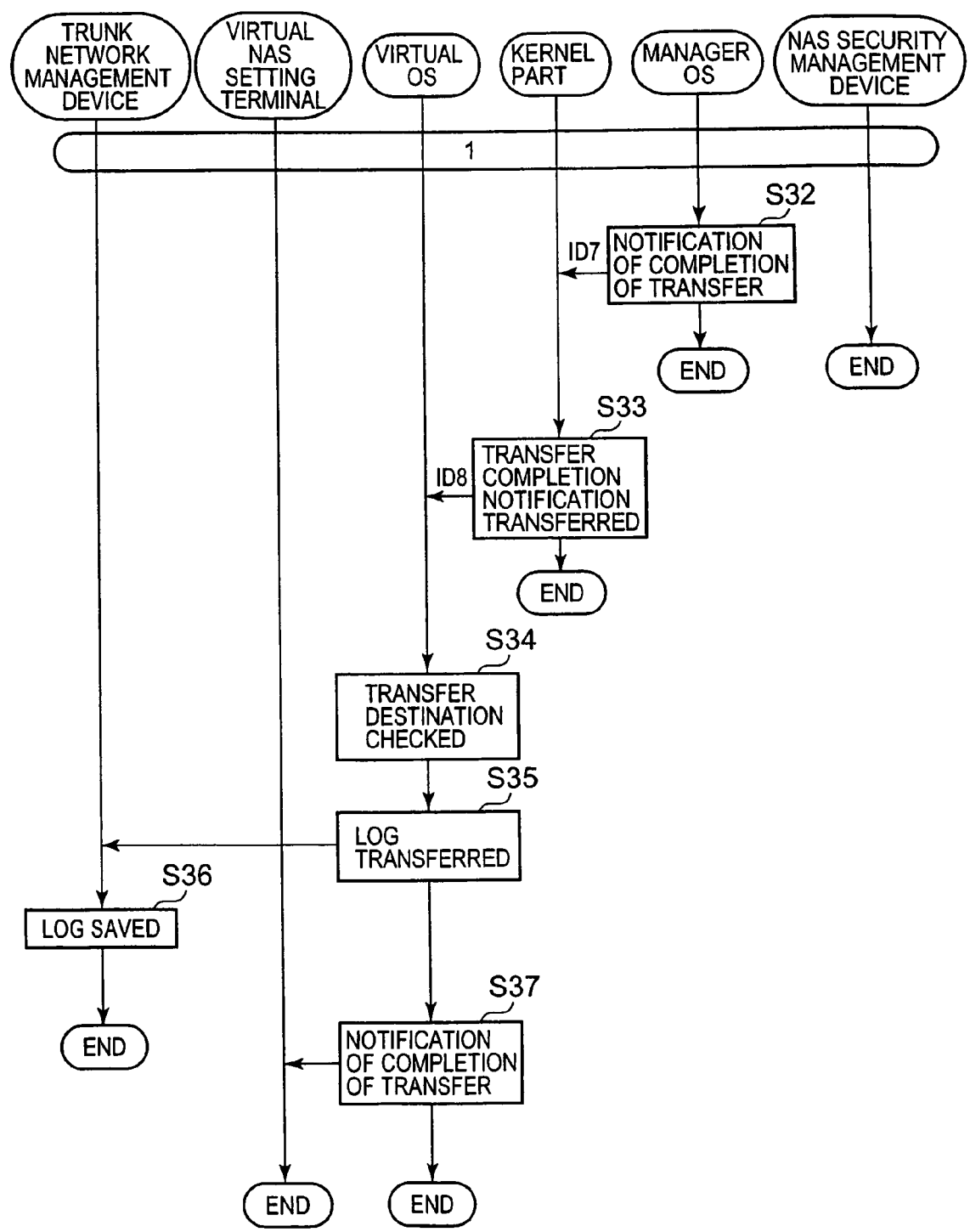
FIG. 16 is a flow chart that is a continuation of FIG. 15.

FIGS. 15 and 16 are flow charts showing the processing used to transmit the log information produced in the virtual OS 133 to external devise (trunk network management device 400, security management terminal 600). The flow chart shown in FIG. 15 and the flow chart shown in FIG. 16 are connected via the connector 1.

The manager on the side of the trunk network CN11 (who may also be called the user manager) can send instructions to alter the settings of the virtual OS (virtual NAS) via the virtual NAS setting terminal 300 (S21). For instance, the creation or deletion of file systems may be cited as examples of instructions for altering the settings.

When the virtual OS 133 receives instructions from the virtual NAS setting terminal 300 via the trunk network CN11, the virtual OS 133 produces log information relating to the setting alteration that is instructed (S22). This log information is stored in the shared disk region 145. The virtual OS 133 refers to the transfer option management DB 143 (S23), and ascertains whether or not the transfer flag is set as "1" (S24).

As was described above, cases in which the transfer flag is set as "1" are cases in which the log information is to be transmitted to and held in both the trunk network management device 400 and security management terminal 600.

Accordingly, the virtual OS 133 sends a request to the manager OS 132 via the kernel part 131 requesting that the log information be transmitted to the security management terminal 600 (S25). The kernel part 131 recognizes the log information transmission request from the virtual OS 133 as information of the reception ID 5. The kernel part 131 notifies the manager OS 132 that the log information is to be transmitted to the outside (i.e., to the security management terminal 600) by means of the request ID 6 corresponding to the reception ID 5 (S26).

When the manager OS 132 recognizes the request from the virtual OS 133 via the kernel part 131, the manager OS 132 refers to the log transfer destination management DB 142, and confirms the network address or the like of the security management terminal 600 that is set as the transfer destination (S27). The manager OS 132 accesses the shared disk region 145, reads out the log information from the shared disk region 145 (S28), and transmits the read-out log information to the security management terminal 600 via the management network CN12 (S29).

When the security management terminal 600 receives the log information from the manager OS 132, the security management terminal 600 manages this log information by storing the information in the log management DB 641 (S30). After the manager OS 132 has transmitted the log information to the security management terminal 600, the manager OS erases the log information stored in the shared disk region 145 (S31).

The description now shifts to FIG. 16. The manager OS 132 notifies the virtual OS 133 via the kernel part 131 that the transmission of log information to the security management terminal 600 has been completed (S32). Furthermore, for example, the system may be constructed so that in cases where the log information cannot be transmitted as a result of the management network CN12 being busy, or as a result of saving being performed by the security management terminal 600, the manager OS 132 waits without erasing the log information stored in the shared disk region 145, and re-transmits the log information after a specified period of time has elapsed.

When the kernel part 131 receives a notification from the manager OS 132 that the transmission of the log information has been completed, the kernel part 131 recognizes this notification as information of the reception ID 7. The kernel part 131 then notifies the virtual OS 133 by means of the request ID 8 that the transmission of the log information has been completed (S33).

When the virtual OS 133 recognizes the notification from the manager OS 132 via the kernel part 131 that the transmission of the log information has been completed, the virtual OS 133 transmits the log information to the trunk network management device 400 as described below.

Specifically, the virtual OS 133 refers to the log transfer destination management DB 144, and confirms the network address or the like of the trunk network management device 400 (S34). The virtual OS 133 then transmits the log information to the trunk network management device 400 via the trunk network CN11 (S35). When the trunk network management device 400 receives the log information from the virtual OS 133, the trunk network management device 400 stores this log information in the in the log management DB 441 (S36).

Finally, the virtual OS 133 notifies the virtual NAS setting terminal 300 via the trunk network CN11 that the transmission of the log information to the trunk network management device 400 has been completed (S37).

Figure 17:
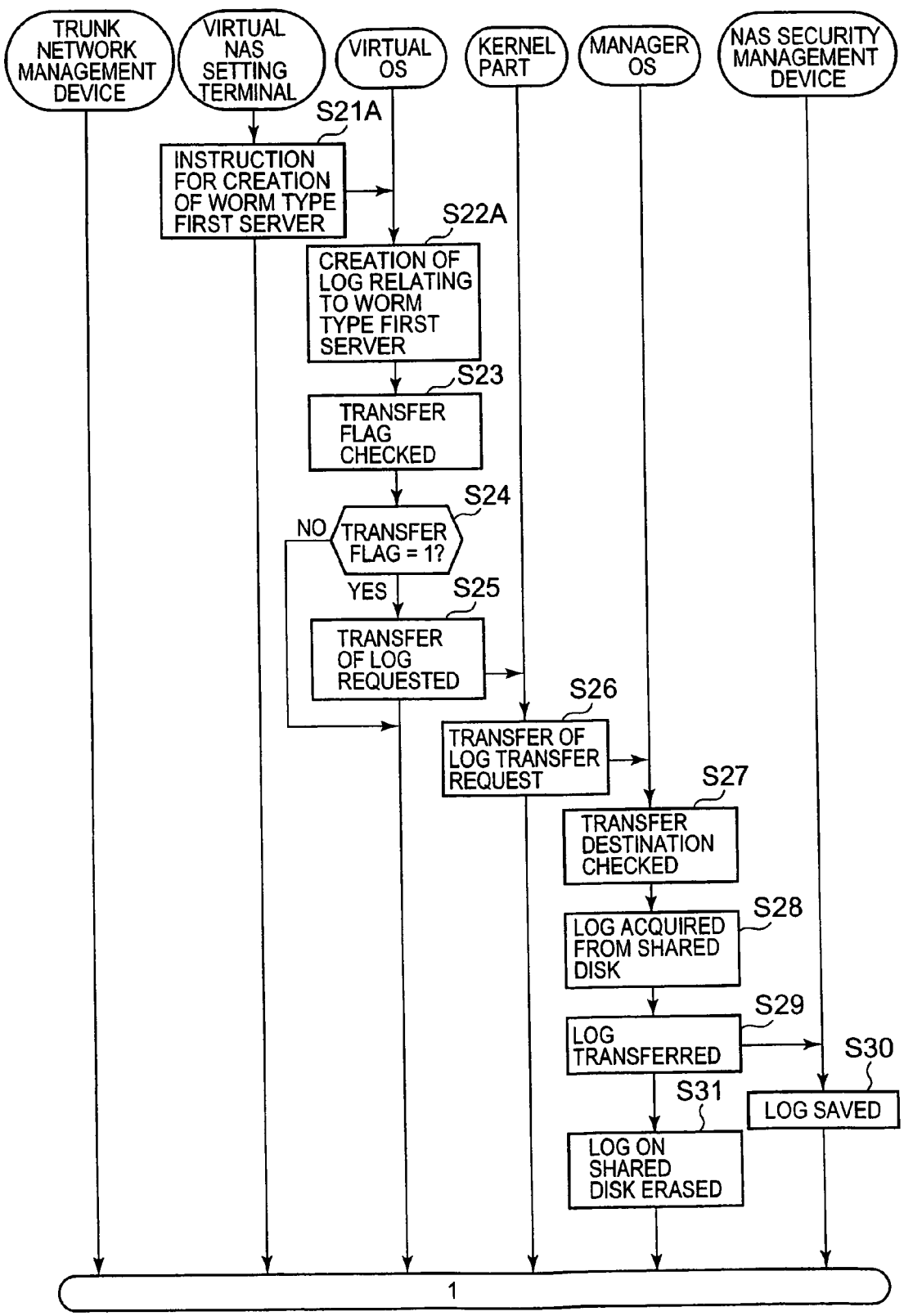
FIG. 17 is a flow chart for a case in which a WORM type file system is produced.

FIG. 17 is a flow chart showing the processing that is performed in a case where a WORM type file system is created in the virtual OS 133. When the user manager sends instructions for the creation of a WORM type file system to the virtual OS 133 via the virtual NAS setting terminal 300 (S21A), the virtual OS 133 produces log information relating to the creation of a WORM type file system (S22A). This log information is stored in the shared disk region 145.

Since the present embodiment is constructed as described above, the following merits are obtained. In the present embodiment, a kernel part 131 is installed between the manager OS 132 and virtual OS 133, and the system is constructed so that specified communications relating to the transmission of log information between the respective OS 132 and 133 cam be performed. Accordingly, the management network CN12 connected to the manager OS 132 and the trunk network CN11 connected to the virtual OS 133 can be separated, and devices 400 and 600 used to manage separate log information can be installed on the respective networks CN11 and CN12. As a result, the same log information can be managed by multiplex management while the respective management devices 400 and 600 are respectively managed by different managers. Accordingly, even if a user manager should alter log information in the trunk network management device 400, this alteration can easily be detected by means of the log information stored in the security management terminal 600. As a result, reliability is improved.

In the present embodiment, a construction is used in which the kernel part 131 allows only specified instructions (including notifications) that are registered beforehand in the inter-OS communications management table T1, and the responses to these instructions, to pass between the manager OS 132 and virtual OS 133. Accordingly, intrusion into the side of the manager OS 132 from the side of the virtual OS 133, and improper behavior relating to the log information, can be prevented, so that the reliability of the system can be improved. Furthermore, a specified instruction issuing source (reception source) and a specified instruction transfer destination (request destination) are registered beforehand in the inter-OS communications management table T1 for each specified instruction; accordingly, the flow of information to OS that are not registered can be prevented, so that the reliability of the system is improved.

In the present embodiment, a construction is used in which the transfer flag is managed by means of the transfer option management DB 143, and either a first mode or a second mode can be exclusively selected as the mode for transmitting the log information. Accordingly, for example, in cases where it is desired to increase the level of reliability, the mode may be set as the second mode (instead of conventional monitoring), while in cases where there is no problem even if alterations or the like are made, the mode may be set as the first mode. As a result, the convenience of the system is improved. Furthermore, in cases where the mode is set as the second mode, in which log information is also transmitted to the security management terminal 600, the fact that the mode has been set as the second mode may also be hidden from the user manager. Furthermore, the system is devised so that the first mode or second mode can be selected in virtual OS units. However, the present invention is not limited to this; it would also be possible to use a construction in which the first mode or second mode can be selected in file system units.

In the present embodiment, a construction is used in which the setting of the transfer flag can be performed only from the NAS node setting terminal 500, and cannot be performed from the virtual NAS setting terminal 300. Accordingly, even in cases where the user manager ascertains that the mode has been set as the second mode, the user manager cannot cancel the second mode. Accordingly, the reliability of the system is improved.

In the present embodiment, a construction is used in which log information is transmitted from the virtual OS 133 to the trunk network management device 400 (S34 through S36) after log information has been transmitted from the manager OS 132 to the security management terminal 600 (S25 through S30). Accordingly, even in cases where some type of trouble occurs in the trunk network CN11, the log information can at least be transmitted to and held in the security management terminal 600. Since the log information that is stored in the security management terminal 600 cannot be altered by the user manager, the reliability of the system can be improved compared to a case where the log information is preferentially transmitted to the trunk network management device 400. Furthermore, the present invention is not limited to this; it would also be possible to use a construction in which the log information is first transmitted to the trunk network management device 400, and is then transmitted to the security management terminal 600.

In the present embodiment, a construction is used in which the log information is transferred from the virtual OS 133 to the manager OS 132 via the shared disk region 145. Accordingly, even in cases where the amount of log information is large, the log information can be efficiently transferred from the virtual OS 133 to the manager OS 132.

In the present embodiment, a construction is used in which the manager OS 132 erases the log information stored in the shared disk region 145 after transmitting the log information to the security management terminal 600. Accordingly, the size of the shared disk region can be set as a small size. Furthermore, since no unnecessary log information is left in the NAS device 100, security is improved.

Embodiment 2

Figure 18:
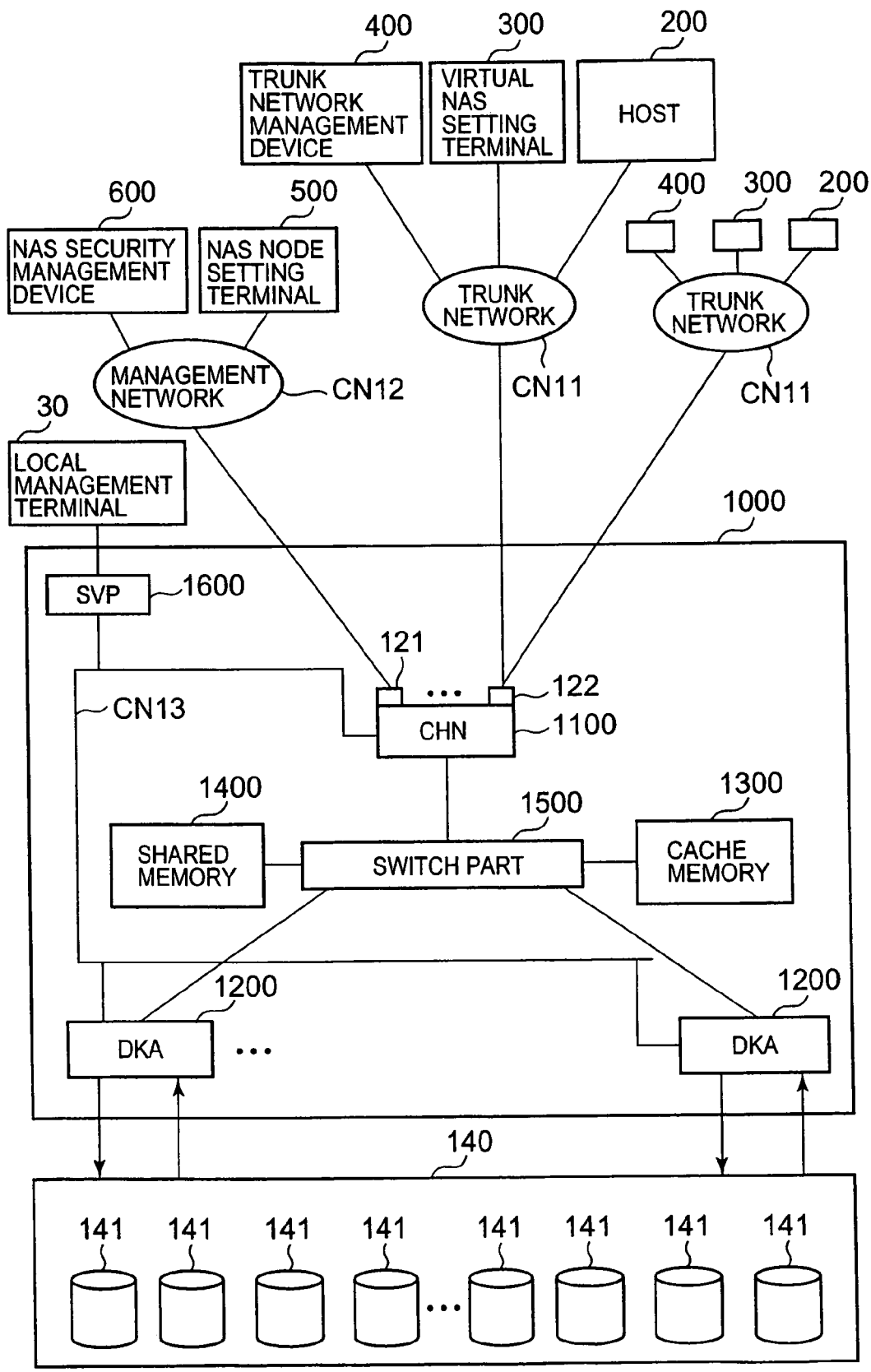
FIG. 18 is a structural explanatory diagram showing the log management system of a second embodiment, in which an NAS device is installed inside the storage control device.

A second embodiment will be described with reference to FIG. 18. The following embodiments including the present embodiment correspond to modifications of the first embodiment. In the present embodiment, an NAS function is provided inside the storage control device.

The storage control device 1000 is connected to a disk device 140 that is installed inside the same housing or in a separate housing. For example, the storage control device 1000 may comprise an NAS channel adapter (CHN) 1100, a disk adapter (DKA) 1200, a cache memory 1300, a shared memory 1400, a switch part 1500, a service processing (SVP) 1600, and a disk device 140.

The CHN 1100 is a computer device corresponding to the abovementioned NAS device 100, and comprises network I/Fs 121 and 122. One network I/F 121 is respectively connected to the NAS node setting terminal 500 and security management terminal 600 via a management network CN12. The other network I/F 122 is respectively connected to the host 200, virtual NAS setting terminal 300 and trunk network management device 400 via a trunk network CN11. The CHN 1100 controls data communications with these respective higher devices 200, 300, 400, 500 and 600. Furthermore, in FIG. 18, for convenience of description, only a single CHN 1100 is shown; however, a plurality of CHNs 1100 can be installed in the storage control device 1000. The DKA 1200 performs data communications with the respective disk drives 141 of the disk device 140. For example, the DKA 1200 and disk device 140 are connected by an SAN (storage area network) or the like. The DKA 1200 converts the logical addresses of data in the cache memory 1300 into physical addressed or the like, and writes the data into specified disk drives 141. In accordance with requests from the CHN 1100, the DKA 1200 reads out data from specified disk drives 141, performs an address conversion or the like, and stores this data in the cache memory 1300. Accordingly, the DKA 1200 also partially realizes the function of an NAS device 100; however, the main NAS function is carried out by the CHN 1100.

The shared memory 1400 stores various types of control information and management information required in order to control the operation of the storage control device 1000. The shared memory 1400 and cache memory 1300 may be constructed as respectively separate memory packages, or the shared memory 1400 and cache memory 1300 may be mounted inside the same memory package. Alternatively, one portion of a single memory may be used as a cache memory, and another portion of this memory may be used as a shared memory.

For example, the switch part 1500 is constructed as a cross bar switch or the like, and respectively connects the CHN 1100, DKA 1200, cache memory 1300 and shared memory 1400.

The SVP 1600 collects various types of status information and the like from the CHN 1000 and DKA 1200 via an internal network CN13, and provides this collected information to a local management terminal 30. For example, the local management terminal 30 may be constructed as a notebook type personal computer or the like that is disposed in the vicinity of the storage control device 1000.

Thus, a construction (CHN 1100 and the like) used to realize an NAS device 100 can be disposed inside the storage control device 1000.

Embodiment 3

Figure 19:
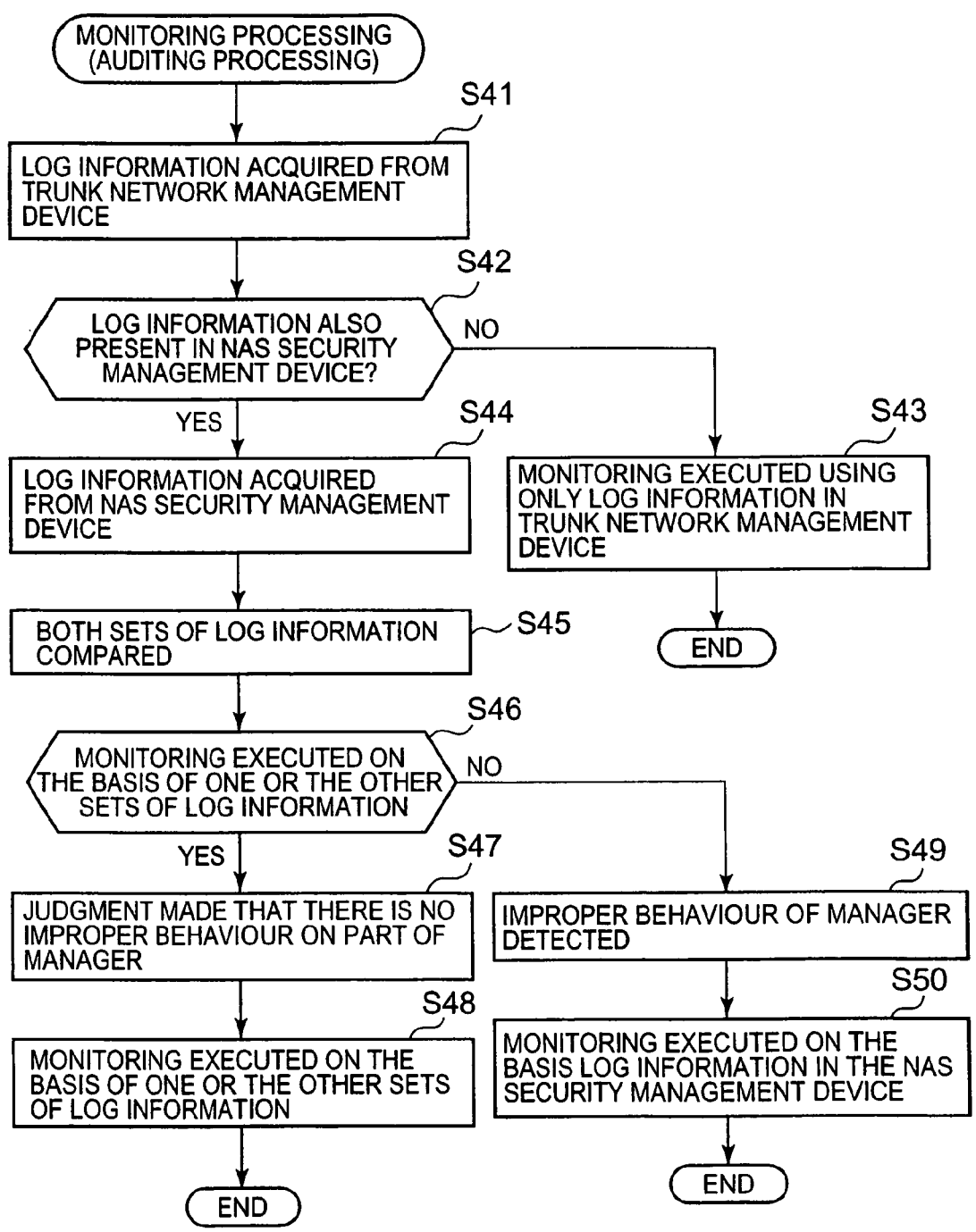
FIG. 19 is a flow chart showing the processing that is used to perform monitoring using the log management system, in a third embodiment of the present invention.

FIG. 19 is a flow chart showing the monitoring processing that is executed in the log management system of a third embodiment. There are cases in which at least a portion of this flow chart can be executed by a computer. Here, however, for convenience of description, this will be described as the flow of a procedure performed by a human monitor.

For example, the monitor reads out log information stored in the trunk network management device 400 via the user interface of this trunk network management device 400 (S41), and ascertains whether or not a backup of this log information is present in the security management terminal 600 (S42). For example, it can be ascertained whether or not a backup of the log information is present by surveying the state of the transfer flag of the transfer option management DB 143.

In cases where the log information is present only in the trunk network management device 400, and is not stored in the security management terminal 600 (S42: NO), monitoring is performed only on the basis of the log information stored in the trunk network management device 400 (S43).

In cases where the log information is also stored in the security management terminal 600 (S42: YES), the monitor reads out the log information from the security management terminal 600 (S44). The monitor then compares the log information stored in the trunk network management device 400 and the log information stored in the security management terminal 600 (S45).

In cases where both sets of log information show complete agreement (S46: YES), the monitor judges that there has been no improper behavior on the part of the user manager with respect to the log information (S47). Then, the monitor executes monitoring by analyzing one or the other of these sets of log information (S48).

In cases where the log information stored in the trunk network management device 400 and the log information stored in the security management terminal 600 show even partial disagreement (S46: NO), the monitor can judge that there has been improper behavior by the user manager in regard to the log information (S49). Accordingly, the monitor executes monitoring on the basis of the log information stored in the security management terminal 600 (S50). In this case, the possibility that other improper behavior can be detected is increased by performing a survey centered on the points of disagreement between the two sets of log information.

Furthermore, the flow chart shown in FIG. 19 was described as a procedure performed by a human monitor; however, this can also be applied in cases where monitoring is automatically performed by a monitoring device. Specifically, a monitoring device constructed as a computer device can be connected to the log management system, and the two sets of log information can be compared and analyzed by means of this monitoring device. In this case, the term "human monitor" in the descriptive text of the abovementioned flow chart may be changed to "monitoring device".

In the present embodiment constructed as described above, the following merit is obtained: namely, in addition to the effects and merits of the abovementioned first embodiment, monitoring can easily be performed.

Furthermore, the present invention is not limited to the respective embodiments described above. A person skilled in the art may make various additions, alterations and the like within the scope of the present invention.

What is claimed is:

1. A file server comprising:
one or more computers configured with:
a first operating system which is a virtual operating system;
a second operating system configured to manage said first operating system;
an inter-operating-system communications part which exchanges predetermined instructions including log information between said first operating system and said second operating system and which responds to said predetermined instructions;
a log information producing part which generates failure information as said log information in said first operating system when a failure occurs;
a first log transmitting part which transmits said log information that is generated in said first operating system from said first operating system to a first log management device via said first communications network; and
a second log transmitting part which transmits said generated log information from said first operating system to said second operating system via said inter-operating-system communications part, and which transmits said log information from said second operating system to a second log management device via a second communications network which is separated from said first communications network, and which is coupled to said second operating system.

2. The file server according to claim 1, further comprising a discriminating information storage part which stores discriminating information that is used to discriminate whether or not said log information is to be transmitted to said second log management device, wherein said second log transmitting part transmits said log information to said second log management device via said second communications network in cases where an indication that said log information is to be transmitted to said second log management device is set in said discriminating information.

3. The file server according to claim 2, wherein said specified instructions include instructions used to set said discriminating information.

4. The file server according to claim 2, wherein said first operating system is coupled via said first communications network to a first setting terminal for performing said change in settings in said first operating system, said second operating system is coupled via said second communications network to a second setting terminal that is used to set said discriminating information, and said discriminating information cannot be manipulated from said first setting terminal.

5. The file server according to claim 1, wherein said first log transmitting part transmits said log information to said first log management device in cases where said second log transmitting part transmits said log information to said second log management part.

6. The file server according to claim 1, further comprising a shared storage part that is used by both said first operating system and said second operating system, said generated log information is stored in said shared storage part from said first operating system, and said second log transmitting part acquires said log information from said shared storage part on the basis of a storage completion notification that is input from said first operating system via said inter-operating-system communications part, and transmits this log information to said second management device via said second communications network.

7. The file server according to claim 6, wherein said specified instructions include said storage completion notification.

8. The file server according to claim 6, wherein said log information stored in said shared storage part is erased when said second log transmitting part transmits said log information acquired from said shared storage part to said second log management device.

9. The file server according to claim 1, wherein said first operating system is provided in a plurality, and said log information producing part respectively generates log information for each of said first operating systems in cases where settings are changed in said respective first operating systems.

10. The file server according to claim 1, further comprising:
a first transmission destination address storage part which stores the network address of said first log management device; and
a second transmission destination address storage part which stores the network address of said second log management device;
wherein said first log transmitting part transmits said log information to said first log management device on the basis of a network address stored in said first transmission destination address storage part, and said second log transmitting part transmits said log information to said second log management device on the basis of a network address stored in said second transmission destination address storage part.

11. The file server according to claim 1, wherein said first communications network is constructed as a virtual communications network that is virtually disposed in a physical communications network.

12. A file server log management system which manages a log produced by a file server, said system comprising:
one or more computers configured with:
a file server in which a plurality of virtual operating systems and a management operating system are respectively operated;
a kernel part which is disposed in said file serve; and which is used to transfer only predetermined instructions including log information between said plurality of virtual operating systems and said management operating system, said log information being a setting in at least one of the operating systems;
a first communications network which is respectively coupled to each of said virtual operating systems;
a first log management device which is respectively coupled to said first communications network;
a first setting terminal which is respectively coupled to said first communications network;
a second communications network which is coupled to said management operating system;
a second log management device which is coupled to said second communications network;
a log information producing part which is respectively disposed in each of said virtual operating systems, and which generates failure information as a log when a failure occurs;
a first log transmitting part which is disposed in said file server, and which transmits said generated log information from said virtual operating system that is associated with said log information to said first log management device via said first communications network that is coupled to said virtual operating system; and
a second log transmitting part which is disposed in said file server, and which transmits said generated log information from said virtual operating system that is associated with said log information to said management operating system via said kernel part, and transmits said log information from said management operating system to said second log management device via said second communications network.

* * * * *